(12) United States Patent
Glover et al.

(10) Patent No.: US 10,180,967 B2
(45) Date of Patent: *Jan. 15, 2019

(54) PERFORMING APPLICATION SEARCHES

(71) Applicant: Samsung Electronics Co., Ltd., Suwon-si, Gyeonggi-do (KR)

(72) Inventors: Eric Glover, San Francisco, CA (US); Liron Shapira, Palo Alto, CA (US); Nicolas Tarleton, Daly City, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/812,314

(22) Filed: Jul. 29, 2015

(65) Prior Publication Data

US 2015/0347420 A1 Dec. 3, 2015

Related U.S. Application Data

(63) Continuation of application No. 13/842,169, filed on Mar. 15, 2013, now Pat. No. 9,152,674.

(60) Provisional application No. 61/639,740, filed on Apr. 27, 2012, provisional application No. 61/680,535, filed on Aug. 7, 2012.

(51) Int. Cl.
*G06F 17/30* (2006.01)

(52) U.S. Cl.
CPC .... *G06F 17/3053* (2013.01); *G06F 17/30613* (2013.01); *G06F 17/30864* (2013.01); *G06F 17/30943* (2013.01)

(58) Field of Classification Search
None
See application file for complete search history.

(56) References Cited

U.S. PATENT DOCUMENTS

| | | | |
|---|---|---|---|
| 7,882,130 B2 | 2/2011 | Byrne et al. | |
| 9,201,946 B2 * | 12/2015 | Shapira | G06F 17/30598 |
| 2003/0200350 A1 | 10/2003 | Kumar et al. | |
| 2004/0143600 A1 | 7/2004 | Musgrove et al. | |
| 2004/0243595 A1 * | 12/2004 | Cui | G06F 17/30557 |
| 2006/0112060 A1 | 5/2006 | Weigt et al. | |
| 2006/0130117 A1 | 6/2006 | Lee et al. | |

(Continued)

OTHER PUBLICATIONS

PCT International Search Report and Written Opinion, PCT Application No. PCT/US2013/038618, dated Oct. 11, 2013, 22 pages.

*Primary Examiner* — Belix M Ortiz Ditren
(74) *Attorney, Agent, or Firm* — Jefferson IP Law, LLP

(57) ABSTRACT

According to some implementations, a technique for processing an application search query is disclosed. The techniques include receiving a search query from a partner, determining a set of subqueries based on the search query, and extracting query features of the search query from the search query. The techniques further include determining an initial result set of applications based on the set of subqueries and the query features. The initial result set includes a plurality of application representations each defining features of a different application. The techniques also include determining a score for each application in the initial result set of applications based on the set of query features and one or more scoring models, determining a result set based on the scores of the applications in the initial result set, and providing the result set to the partner.

18 Claims, 12 Drawing Sheets

(56) References Cited

U.S. PATENT DOCUMENTS

| | | | |
|---|---|---|---|
| 2006/0136411 A1* | 6/2006 | Meyerzon | G06F 17/30684 |
| 2007/0226242 A1* | 9/2007 | Wang | G06F 17/30864 |
| 2011/0047185 A1 | 2/2011 | Cho et al. | |
| 2011/0047594 A1 | 2/2011 | Mahaffey et al. | |
| 2012/0316955 A1* | 12/2012 | Panguluri | G06Q 30/02 |
| | | | 705/14.41 |
| 2013/0191397 A1 | 7/2013 | Avadhanam et al. | |
| 2014/0250098 A1 | 9/2014 | Kasterstein et al. | |
| 2016/0055231 A1* | 2/2016 | Shapira | G06F 17/30598 |
| | | | 707/737 |

\* cited by examiner

PERFORMING APPLICATION SEARCHES

CROSS REFERENCE TO RELATED APPLICATIONS

The present application is a Continuation Application of U.S. patent application Ser. No. 13/842,169, filed Mar. 15, 2013, which claims the benefit of U.S. Provisional Application 61/639,740, filed on Apr. 27, 2012 and U.S. Provisional Application 61/680,535, filed on Aug. 7, 2012. The disclosures of the prior applications are considered part of the disclosure of this application and are hereby incorporated by reference in their entirety.

BACKGROUND

Field of Art

The disclosure generally relates to the field of search, and in particular to performing application searches.

Description of the Related Art

In recent years, use of computers, smartphones, and other Internet-connected devices has grown exponentially. Correspondingly, the number of available applications for such devices has also grown. Today, many diverse applications can be accessed on any number of different devices, including, but not limited to, smartphones, personal computers, refrigerators, automobiles, and televisions. These diverse applications can range from business driven applications, games, educational applications, news applications, shopping applications, efficiency applications, messaging applications, video chatting applications, media streaming applications, social networking applications, and so much more. Furthermore, application developers develop vast amounts of applications within each genre and each application may have numerous editions.

BRIEF DESCRIPTION OF DRAWINGS

The disclosed implementations have other advantages and features which will be more readily apparent from the detailed description, the appended claims, and the accompanying figures (or drawings). A brief introduction of the figures is below.

DETAILED DESCRIPTION

The Figures (FIGS.) and the following description relate to example implementations by way of illustration only. It should be noted that from the following discussion, alternative implementations of the structures and methods disclosed herein will be readily recognized as viable alternatives that may be employed without departing from the scope of the disclosure. It is noted that wherever practicable similar or like reference numbers may be used in the figures and may indicate similar or like functionality.

Application Search System

As the number of applications that are generally available increases, the ability of a potential user to identify applications that perform specific functions greatly decreases. As used herein, the term "application" can include any software that can be executed to provide a functionality. Furthermore, "applications" can be designed for various platforms, including but not limited to, various mobile computing device operating systems, personal computing device operating systems, and various web browsers (e.g., web applications and browser plugins). The term "application" may also refer to a representative of one or more related applications, e.g., "free" and "pay" editions of an application. Potential consumers learn about applications by word of mouth, random searches through application retailer sites, articles on popular or new applications, and keyword-based searches on search engines.

The present disclosure relates to techniques for facilitating application searches. As used herein the term "application search" can refer to the processing of a search query intended to identify one or more applications based on the contents of the query. The present disclosure relates to generating and updating a back-end infrastructure to support application searches and a front-end processing of the search queries.

Figure 1:
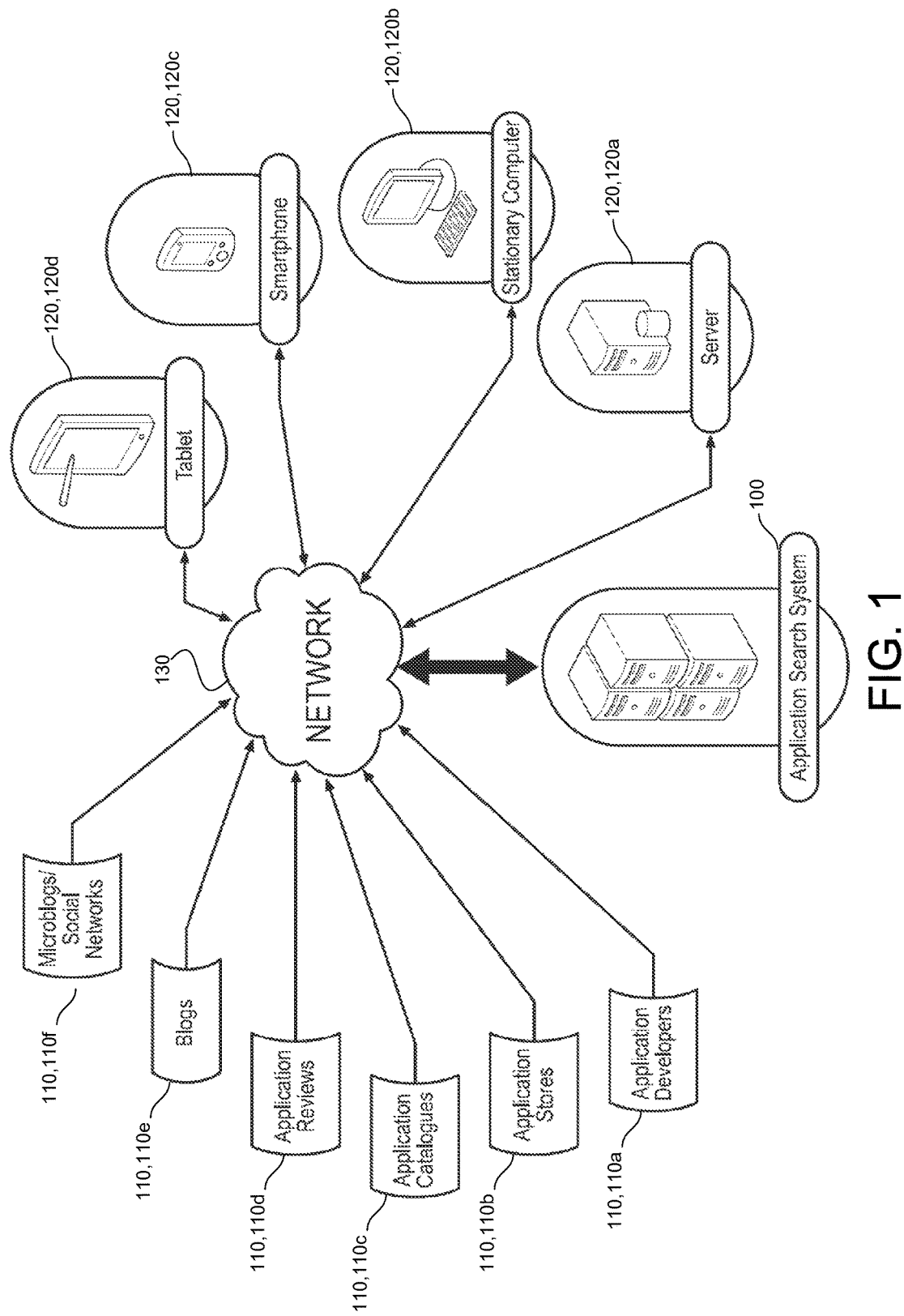
FIG. 1 is a drawing illustrating an application search system configured to support application searches.

FIG. 1 is a schematic illustrating an application search system 100 configured to support application searches. In the illustrated example, the application search system 100 receives application data from various data sources 110. The application data is used to generate one or more search indexes corresponding to various applications. The term "application data" can refer to any type of information relating to an application. Examples of data sources 110 can include, but are not limited to, application developers 110a, application stores 110b, application catalogs 110c, application reviews 110d, blogs 110e, and micro blogs/social networking sites 110f. Examples of application data includes a title of an application, a description of an application, a substantive review of an application, a quality rating, a numerical review rating of an application, a developer name, a title name, an icon, an excerpt from a blog post about an application, and a tweet about an application. According to some implementations of the present disclosure, the application search system 100 is configured to generate and update a search index that is used in connection with application searches based on the received application data.

The application search system 100 is further configured to receive search queries from various partner devices 120. As used herein, the term "partner" may refer to any third party entity (e.g., a company or other organization) or an end user (e.g., an individual consumer) that leverages the search functionality of the application search system 100. A partner device 120 can be any computing device that is capable of providing search queries to the application search system 100. Examples of partner devices 120 include, but are not limited to, tablet computers 120a, smartphones 120b, personal computers 120c, and third party servers 120d. Other types of partner devices 120, such as consumer electronics having user interfaces (e.g., vehicle infotainment systems, gaming devices, networked refrigerators, and televisions), are contemplated and within the scope of the disclosure. In the case of an end user device, e.g., tablet computers 120a, smartphones 120b, and personal computers 120c, the end user device can access the application search system 100 via a web browser, a dedicated application, and/or a third party server 120d that utilizes one or more APIs to access the application search system 100.

Figure 2:
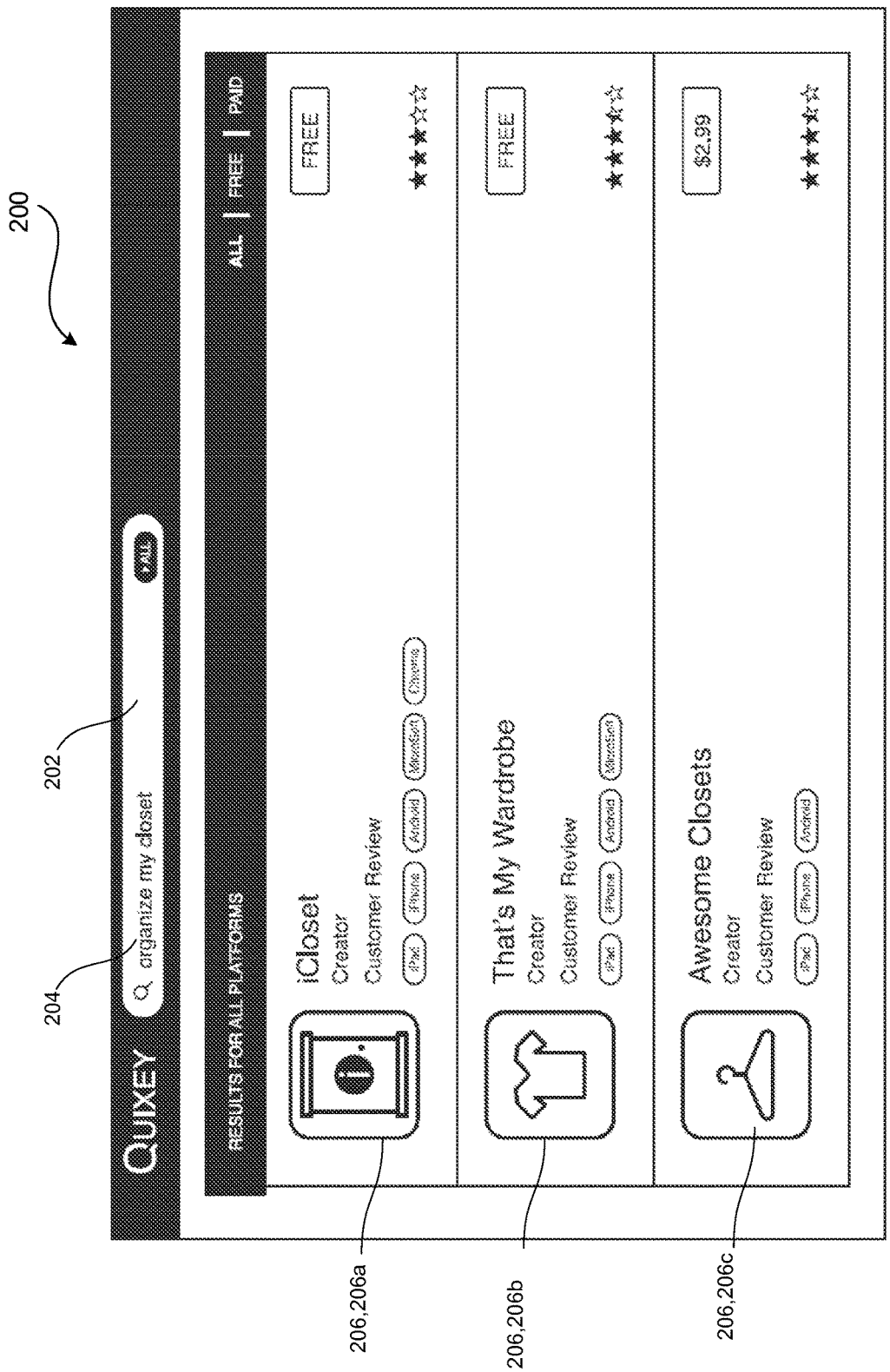
FIG. 2 is a drawing illustrating an example graphical user interface (GUI) for receiving search queries and providing search results.

In operation, the application search system 100 can provide a graphical user interface (GUI) to a partner device 120. FIG. 2 illustrates an example GUI 200 that can be displayed at a partner device 120 (or another device in operative communication with the partner device). The GUI 200 includes a text input object 202 that receives a search query 204 input by a user. In the illustrated example, the user has input a search query 204 that states "organize my closet." The partner device 120 can transmit the search query 204 to the application search system 100 via the network 130 and may receive search results 206 including a list of representative applications in response to the search query 204. The search results 206 are displayed in the GUI 200. In the illustrated example, the search results 206 include a first representative application 206a, a second representative application 206b, and a third representative application 206c. The representative applications can be "canonical applications" (discussed in further detail below) which represent one or more "edition applications" (discussed in further detail below). As will be discussed in further detail below, a search result 206 does not require a keyword match to the search query 204 in order to be relevant to the search query 204. For example, the second representative application 206b may be relevant to the search query "organize my closet" despite the words "organize" and "closet" not appearing in the title or application description of the second representative application 206b. The GUI 200 of FIG. 2 is provided for example only and not intended to be limiting. Variations of the GUI 200 are contemplated and within the scope of the disclosure. For instance, the GUI 200 may display one or more filters, which allow a user to limit or restrict the scope of a search. For instance, the filters may allow a user to limit the scope of the search by device type, e.g., smartphone, tablet, or web browser, and/or by platform, e.g., IOS® by APPLE, INC. of Cupertino, Calif., ANDROID® by GOOGLE, INC., or WINDOWS MOBILE® by MICROSOFT CORP., of Redmond, Wash. A user can select one or more filters via the GUI 200, such that the search results only contain results pertaining to the selected filter or filters. Furthermore, in the scenario of a third party server 120d, the third party server 120d may provide its own GUI to an end-user device, such that the end-user device accesses the application search system 100 via the third party server 120d.

Figure 3:
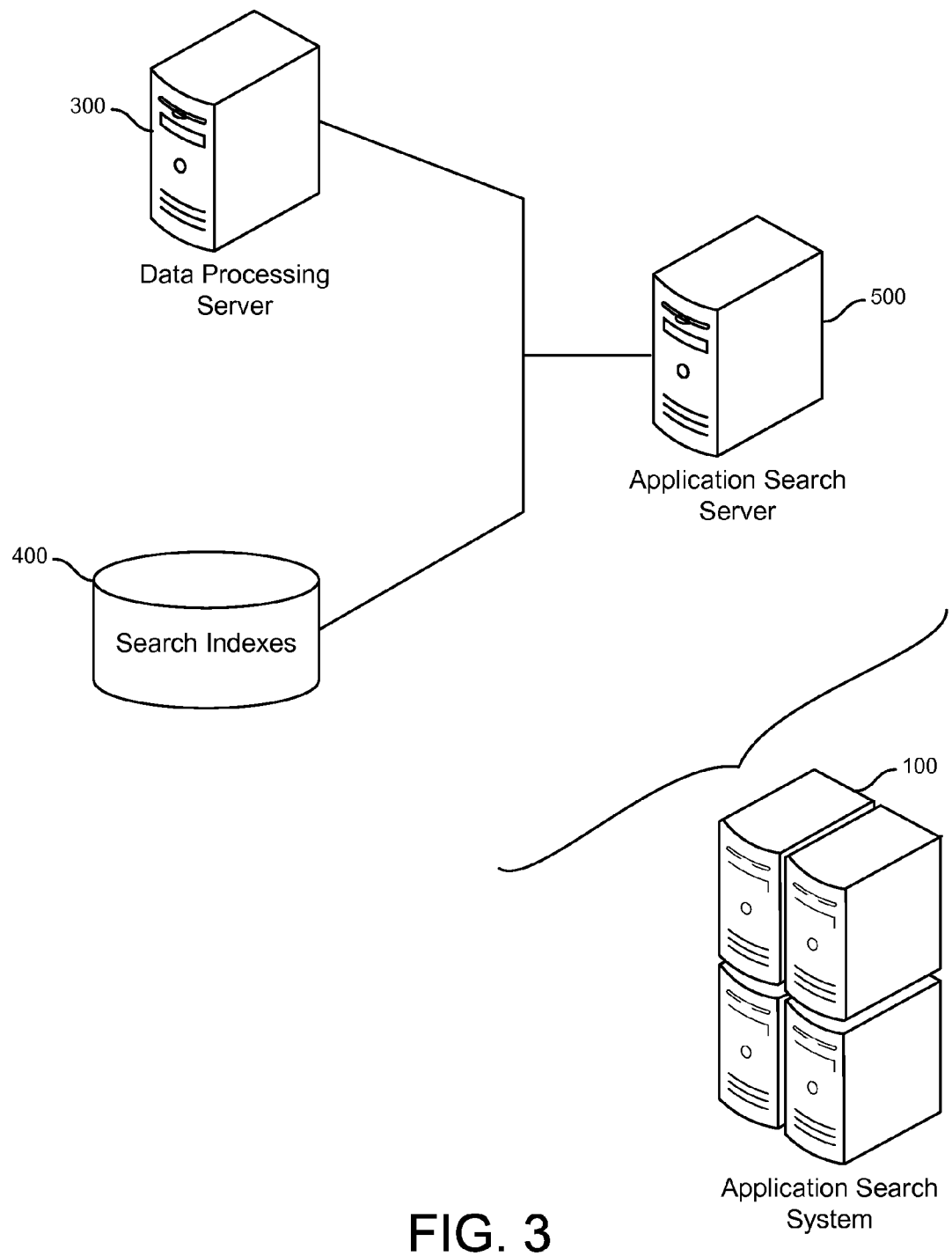
FIG. 3 is a schematic illustrating an example set of components of the application search system of FIG. 1.

Referring now to FIG. 3, an example configuration of the application search system 100 is depicted. In the illustrated example, the application search system 100 includes a data processing server 300, a search index 400, and an application search server 500. While the example application search system 100 shows the data processing server 300 and the application search server 500 as being separate server devices, the application search system 100 can be implemented in a single server device without departing from the scope of the disclosure. Furthermore, the application search server 500 and/or the data processing server 300 can be implemented as a collection of networked servers working independently or in a distributed manner. Additionally, the search index 400 can be implemented on an independent data server or on data processing server 300 and/or the application search server 500. In implementations where the search index 400 is maintained at more than one server, the search index 400 may be updated regularly to maintain consistency between each instance of the search index 400.

In operation, the data processing server 300 collects application data from various data sources 110 and identifies one or more applications that are referenced in the application data. For the identified applications, the data processing server 300 can generate an application representation of the identified application based on the application data and an application search specific schema. As used herein, the term "application representation" can include any instance of a data structure that defines the attributes of an application according to the application search specific schema. The term "application search specific schema" can refer to any suitable schema that defines the structure of an application representation and the types of attributes that can be used to describe an application. Furthermore, the application search specific schema can include tags that can be associated with the attributes, such that the attributes can be classified. As used herein, an attribute or feature can refer to any information about an application that can be generated from the application data or information relating to a query that can be extracted from a query. It is noted that attributes, or features, can be numerical values, textual values, binary values, or any other suitable type of values.

Figure 4:
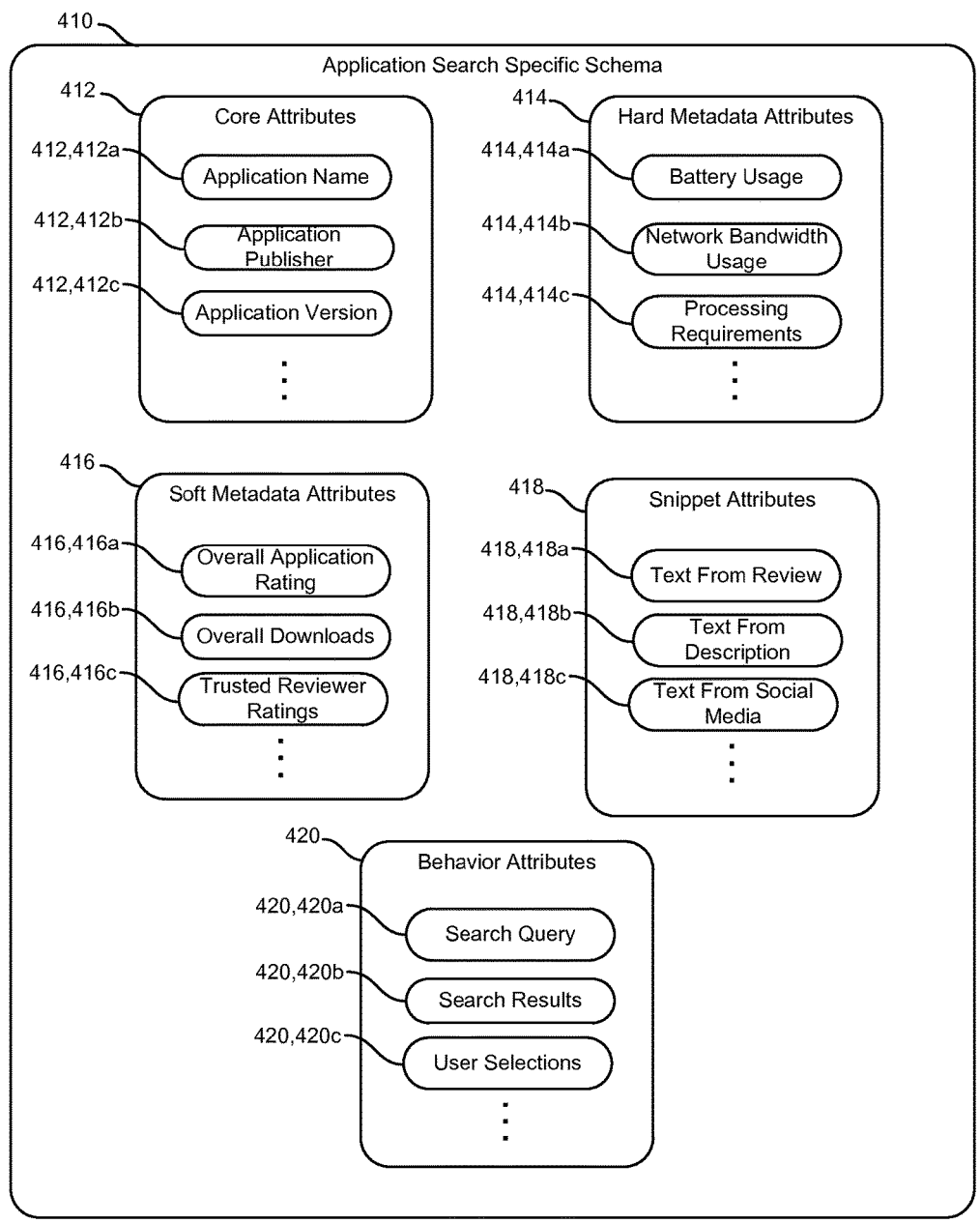
FIG. 4 is a schematic illustrating an example of an application search specific schema.

FIG. 4 illustrates a non-limiting example of an application search specific schema 410. In the illustrated example, the application search specific schema 410 includes at least five attribute categories. The attribute categories include core attributes 412, hard metadata attributes 414, soft metadata attributes 416, snippet attributes 418, and behavior attributes 420. Core attributes 412 can include specific identification information of an application. Examples of core attributes 412 include, but are not limited to, an application name 412a, an application publisher 412b, an application version 412c, and an application platform (not shown). Hard metadata attributes can include measurable information corresponding to an application or statements regarding the application. Examples of hard metadata attributes 414 can include, but are not limited to, a battery usage 414a of an application, network bandwidth requirements 414b of the application, and the overall downloads 414c of the application. Soft metadata attributes 416 can include subjective information corresponding to an application or sentiments. Examples of soft metadata attributes 416 can include, but are not limited to, an overall application rating 416a, an age rating 416b, and a trusted reviewer rating 416c. Snippet attributes 418 can include data that provides supporting information corresponding to an application. Examples of snippet attributes 418 can include, but are not limited to, text from a review 418a, text from a description 418b, and text from a social media posting 418c. Behavior attributes 420 can include data resulting from analysis of the actions of partners. Behavior attributes 420 can be determined from actions of the partner devices 120. Examples of behavior attributes can include, but are not limited to, search queries 420a, search results 420b, and user selections 420c. The foregoing list of attribute categories and attribute types is provided for example only. Additional or alterative categories may be included in the application search specific schema 410. Furthermore, any type of attribute that may be collected may be included in the application search specific schema 410. The application search specific schema 410 can further include the syntax for defining each of the attributes in an application representation. For example, the application search specific schema 410 can define a plurality of different tags for tagging each identified attribute.

Referring back to FIG. 3, the data processing server 300 extracts attributes of an application from the application data and generates application representations based on the extracted attributes and the search specific schema 410. The data processing server 300 can build and update the search index 400 based on the generated application representations. A search index 400 can be a database or a table of a database whose entries are application representations. In this way, the search index is searchable by the attributes of the application representations. While one search index is shown, the application search system 100 can include more than one search index 400. For instance, each of the search indexes 400 may represent a different category of applications, e.g., games, productivity, lifestyle, and educational. In these implementations, the time required to search for an application can be reduced, as the search indexes 400 can be searched in parallel and/or some of the search indexes 400 may be excluded from the search altogether.

The application search server 500 receives a search query from a partner device 120 and searches for one or more applications based in part on desired functionalities expressed in a search query received from a partner device 120. More specifically, in response to receiving a search query from a partner device 120, the application search server 500 identifies one or more relevant applications based on the search index 400 and the search query. In some implementations, the application search server 500 identifies the one or more applications based on how closely the functionalities of the applications match the functionalities expressed (either implicitly or explicitly) in the received search query. The application search server 500 can return a result set referencing the identified applications.

Data Processing Server

Figure 5:
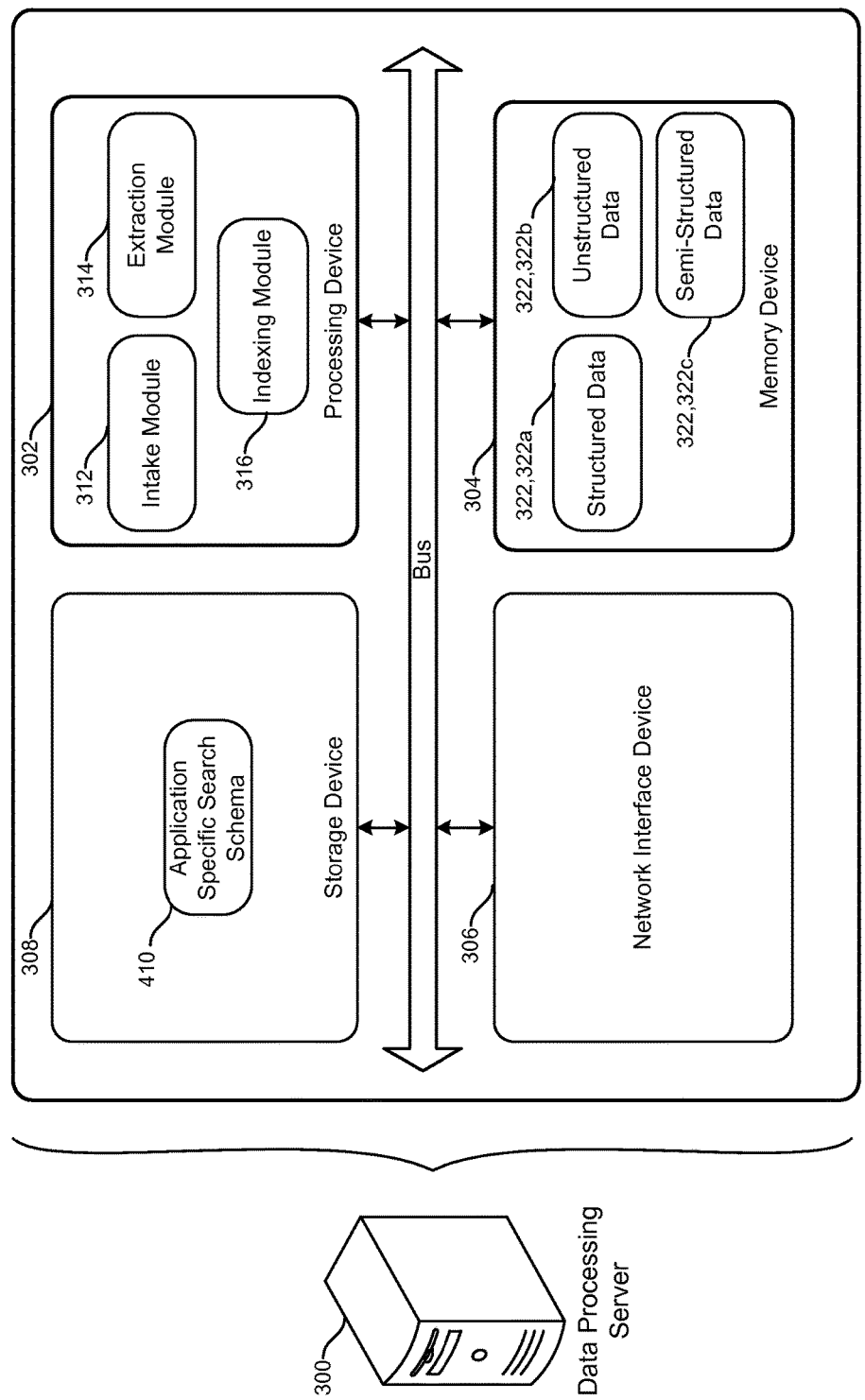
FIG. 5 is a schematic illustrating an example set of components of a data processing server.

FIG. 5 is a schematic illustrating example components of a data processing server 300. The data processing server 300 can include a processing device 302, a memory device 304, a network interface device 306, and a storage device 308. It should be appreciated that the data processing server 300 can include additional components not shown in FIG. 5.

The processing device 302 can include one or more processors and memory (e.g., read-only memory or random access memory) that store machine-readable instructions that are executed by the one or more processors. In implementations where the processing device 302 includes more than one processor, the processors can execute in an individual or distributed manner. In some implementations, the processing device 302 can execute an intake module 312, an extraction module 314, and an indexing module 316.

The memory device 304 is a non-transitory computer readable medium of the computing device 10. While one memory device 304 is depicted, the term "memory device" can include one or more computer readable mediums. Examples of memory devices include, but are not limited to, read-only memory (ROM), dynamic random access memory (dRAM), and/or static random access memory (sRAM). The memory device 304 can store application data 322, including but not limited to, structured application data 322a, unstructured application data 322b, and semi-structured application data 322c.

The network interface device 306 performs communication with other remote devices via the network 130. The network interface device 306 can perform wired or wireless communication. Examples of the network interface device 306 include, but are not limited to, a transceiver configured to perform communications using the IEEE 802.11 wireless standard, an Ethernet port, and a universal serial bus (USB) port. While network interface device 306 is illustrated, the term network interface device 306 can include one or more network interface devices 306.

The storage device 308 is a non-transitory non-volatile computer readable medium. While one storage device 308 is depicted, the term "storage device" can include one or more computer readable mediums. Examples of storages devices include, but are not limited to, hard disk drives, solid state drives, optical disk drives, and flash drives. In some implementations, the storage device 308 stores the application specific search schema 410.

Figure 6:
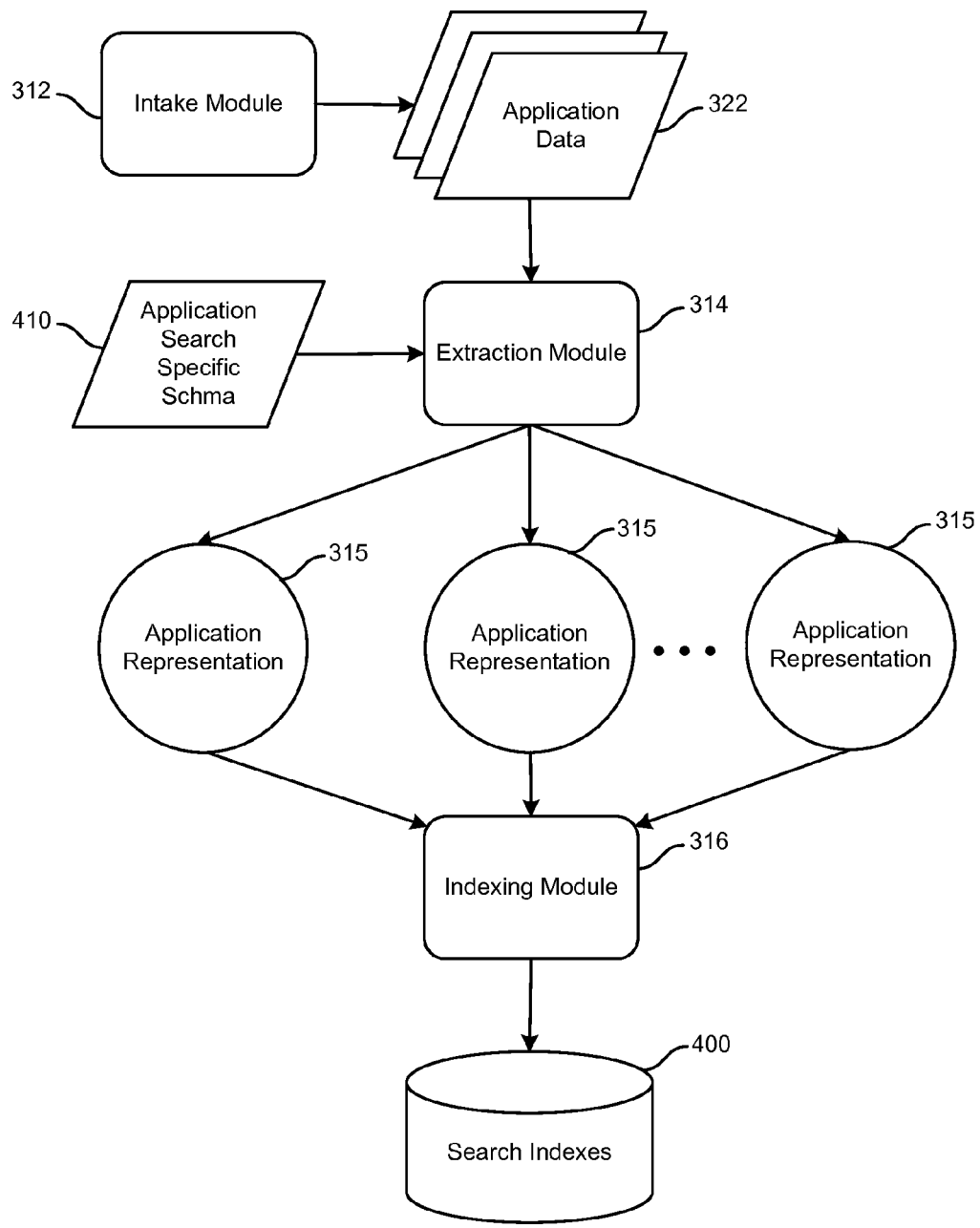
FIG. 6 is a data flow diagram illustrating an example data flow of the data processing server.

FIG. 6 is a data flow diagram illustrating an example data flow of the data processing server 300. The intake module 312 collects application data 322 from various data sources 110. The intake module 312 may passively collect and/or actively collect application data 322 from the various data sources 110. In the former scenario, a data source 110 may send application data 322 to the data processing server 300. In the latter scenario, i.e., actively collects, the intake module 312 may implement a web crawler that browses the World Wide Web and/or known application retail sites in an automated manner seeking application data 322 and/or may transmit requests for application data 322 to known data sources 110. As mentioned, the application data 322 can be structured application data 322a, unstructured application data 322b, and semi-structured application data 322c. As used herein, the term "structured application data" may refer application data that is specifically associated with a particular data field. For example, structured application data 322a may include an application name explicitly defined in a title data field. The term "unstructured application data" may refer to application data not specifically associated with a particular data field. Unstructured application data 322b may be in free form, such as data received from various social network feeds 122f, micro blog feeds 122f, blogs 122e, and reviews 110d. The term "semi-structured application data" may refer to application data that at a broad level is associated with a particular data field but the text within the data field is provided in an unstructured manner. For example, an item of application data 322 may be broadly associated with a description data field. The item of application data 322, however, may include paragraphs of text, which at a granular level may be considered unstructured. In some implementations, the type of application data 322 (structured, unstructured, or semi-structured) may influence the manner in which the data is processed and be used to facilitate application searches.

Figure 7:
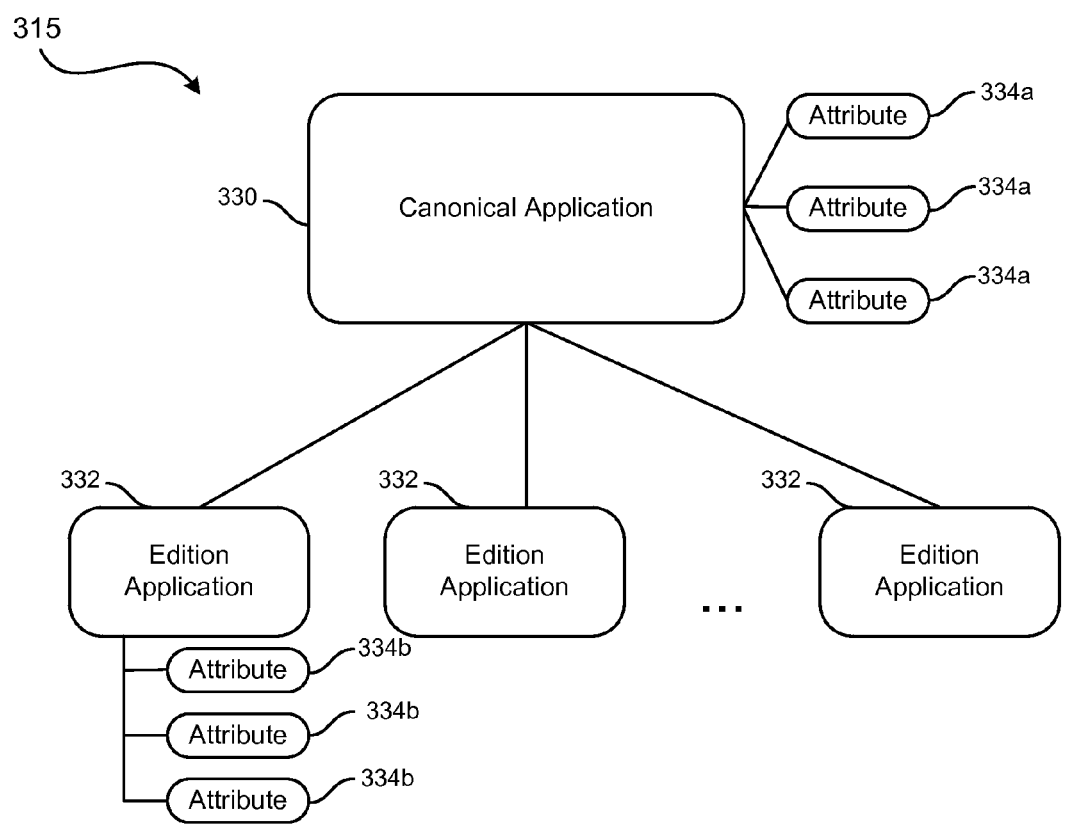
FIG. 7 is a drawing illustrating an example of an application representation.

The extraction module 314 analyzes the application data 322 and generates one or more application representations 315 based thereon. FIG. 7 illustrates an example of an application representation 315. An application representation 315 can include a canonical application 330 and a group of one or more edition applications 332. Furthermore, the application representation can include attributes 334 corresponding to the canonical application 330 ("general attributes" 334a), and attributes 334 corresponding to the edition applications 332 ("edition attributes" 334b). As used herein, the term "canonical application" can refer to a representative of a group of similar applications, e.g., edition applications 332. In some implementations, the canonical application 330 is a representative or umbrella under which the one or more edition applications 332 are categorized. The group of one or more edition applications 332 refers to a group of applications that are functionally similar. Put another way, edition applications 332 are applications which have similar programming and/or functionality. Examples of edition applications 332 are different release versions of an application (e.g., beta, 1.0, or 2.0), different language versions of an applications (e.g., English, Russian, or Chinese), different platform versions of an application (e.g., iOS® or ANDROID®), different functional characteristics (e.g., a light version, an advanced user version), different aesthetic characteristics (e.g., a holiday themed version), and different resolution versions of an application (e.g., standard definition or high definition). It is noted that applications which are related but not similar, e.g., sequels in a series of games or a different release of a serial software, are typically not classified under the same canonical application 330. For example, ANGRY BIRDS may be a separate canonical application from ANGRY BIRDS STAR WARS. Although the applications may have a same underlying concept, they are separate games. In some implementations, the application search specific schema 410 can define how an application representation 315 is organized. For example, the application-search specific schema 410 may indicate that certain attributes 334a be grouped under the canonical application whereas other attributes 332b may be organized as part of each edition of the canonical application. Illustratively, a general attribute 334a defining the functionality of an application may be organized under the canonical application whereas an edition attribute 334b indicating the platform that an edition application executes on may be organized under each respective edition application.

The extraction module 314 can identify a canonical application 330 and its corresponding edition applications 332 in any suitable manner. In some implementations, the extraction module 314 parses and merges the application data 322 to identify potential canonical applications 330 and edition applications 332 referenced therein. Merging the application data 322 can include grouping edition applications 332 based on the application data 322 and reconciling the groupings.

Grouping edition applications 332 can include identifying application titles that are identical or substantially similar. The extraction module 314 can identify the application titles that are similar based on a number of considerations, including, the title of the application, the developer of the application, and/or an application retail site identification number of an application. The application retail site identification number can be a reference number that is used to index a particular application on an application retail site. When grouping the edition applications under a canonical application and generating the canonical application name, the extraction module 314 can remove common words in application titles such as (but not limited to) "free," "lite," "HD," "trial," "beta," "version," "English," (or any other language), "pay," "iOS," "Android," and "full" from the names of the edition applications. By way of example, the application data 322 may include references to various titles that reference the ANGRY BIRDS® collection of applications (by Rovio Entertainment Ltd.). The titles that are referenced may include "ANGRY BIRDS v.1," "ANGRY BIRDS v.2," "ANGRY BIRDS LITE," "ANGRY BIRDS HD," "ANGRY BIRDS ANDROID," and "ANGRY BIRDS IOS." In this example, the extraction module 314 can remove the common words such that all of the above-referenced applications are referred to as "ANGRY BIRDS." Furthermore, the extraction module 314 can compare the developer name of each edition application 332 to determine whether the various edition applications 332 should be grouped together. In this example, all of the referenced applications have a common developer, e.g., "Rovio Entertainment." The extraction module 314 can remove common words from developer names as well. For example, words such as "INC.," "L.L.C.," and "LTD.," can be removed from the developer name. The extraction module 314 can group the various edition applications that have matching or substantially matching names and developer names.

In another example, the extraction module 314 may also compare the name of each edition application 332 with a list of previously identified canonical applications 330 or a list of hard coded canonical applications 330, e.g., the 10000 most popular applications. If the name and developer name corresponding to an edition application 332 match a previously identified canonical application 330, the edition application 332 can be grouped with the group of edition applications 332 represented by the previously identified canonical application 330. If the edition application 332 has not been included in the application representation 315, the edition application 332 can be added to the application representation 315. If the name and the developer name do not match any of the known applications, the extraction module 314 can create a new canonical application 330 and a new edition application 332, the combination of which comprises a new application representation 315.

The extraction module 314 analyzes the application data 322 to extract the attributes of an application, e.g., canonical application 330 or edition application 332. As previously discussed, the application data 322 can be any textual or numerical data received from one or more of the application data sources 110. In some implementations, the extraction module 314 implements data mining and/or natural language processing techniques to identify the textual attributes of an application. In particular, the extraction module 314 can perform data mining on the structured, unstructured and semi-structured application data 322 to extract the textual attributes. In some implementations, the extraction module 314 is configured to parse and analyze semi-structured data 322c and unstructured data 322b for specific words or phrases, such as a name of an edition application 332 or a canonical application 330, words that are found in reviews, words found when describing specific attribute, e.g., battery or secure, or any other suitable words. The extraction module 314 can then extract the text surrounding the specific word or phrase. For example, the extraction module 314 can extract semantic segments surrounding a core word or word or phrase. Additionally, the data mining techniques implemented by the extraction module 314 can further extract numerical or binary attributes from the application data 322.

In some implementations, the extraction module 314 analyzes the text contained in the application data 322 and implements a rules-based inference scheme to extract attributes from the application data 322. For example, the extraction module 314 can analyze an application developer's application description to identify a language of the text and an IP address of the application developer's website. Based thereon, the extraction module 314 can determine a primary demographic of an edition application 332. For example, the extraction module 314 may determine that a website is written in the Portuguese language and that the IP address for the website specifies a location of Brazil. As such, the extraction module 314 may extract an attribute of the application indicating that the application is primarily directed at a Brazilian Portuguese-speaking audience. In another example, the extraction module 314 can parse the text of the application data 322 for words having high term frequency-inverse document frequency values and can utilize an association table to infer and assess the value of semantic chunks of application data.

In some implementations, the extraction module 314 extracts ratings attributes, e.g., overall application rating attributes 416a or trusted reviewer ratings 416c, by combining application data from different sources. Illustratively, the extraction module 314 may identify quality ratings from a plurality of reviews and may normalize and combine the quality ratings to obtain the overall application rating. Similarly, if the quality ratings are all from known sources, e.g., reputable reviewing publications or bloggers, the extraction module 314 can normalize and combine the quality ratings to obtain the trusted reviewer rating attribute 416c.

In some implementations, the extraction module 314 extracts attributes by analyzing different combinations of the received application data 322. As an example, the application data 322 from an application developer may include text that indicates that an application is appropriate for children under the age of thirteen, e.g., "Great for children under thirteen." One or more reviews associated with the application may indicate that the application is appropriate for children of age five. By combining the application data 322, the extraction module 314 can extract an age attribute of "5 to 13." As another example, a first instance of application data 322 may include a comment stating that an application is "great for making video calls to my friends using my computer." A second instance of application data 322 from a developer description may state "makes internet calls." Based on an analysis of the two data items, the extraction module 314 may extract or derive an "Internet video-conferencing" category attribute for the application. It should be appreciated that neither of the data items alone indicate that the application is able to perform "Internet video-conferencing." However, taken together, such an attribute can be extracted or derived.

Extraction of an attribute through analysis of different combinations of the received data may proceed in any suitable manner. For example, the extraction module 314 may combine two or more instances of application data 322 referencing the same edition application 332 or canonical application 330. After combining the application data 322, the extraction module 314 can analyze the combined application data 322 for various patterns, associations, or keyword matches to extract attributes.

In some implementations, the extraction module 314 may extract an attribute based on the sources and/or the types of the received application data 322. For example, application data 322 may indicate that an application has a low security risk. The extraction module 314 may extract a security attribute from the application data 322 if the data source 110 is a trusted source, and if the portion indicating that the application is a low security risk is received in structured form. In contrast, the extraction module 314 may not extract an attribute indicating that the application is a low security risk if the data source 110 is not a trusted source or if the application data 322 is received in an unstructured form.

In some implementations, the extraction module 314 may extract an attribute of an application by monitoring the behavior of a partner device 120 in response to receiving results of a search query. For instance, if a query for a particular functionality results in a specific canonical application 330 being provided to a partner device 120 and the partner device 120 subsequently downloads an edition application 332 corresponding to the canonical application 330, the extraction module 314 can infer that the canonical application 330 performs the function implicated in the search query and can extract an attribute indicating the same functionality.

In some implementations, the extraction module 314 classifies each extracted attribute according to the application-search specific schema 410. As the extraction module 314 extracts the attributes, each attribute, textual, numerical, binary, or otherwise, may be tagged in accordance with the application search specific schema 410. The extraction module 314 can determine the classification of the attribute based on the rule which was used to extract the attribute.

The extraction module 314 generates or updates an application representation 315 based on the extracted attributes 334 and the application specific search schema 410. In some implementations, the set of tagged attributes 334 corresponding to a canonical application 330 and its corresponding edition applications 332 define the application representation 315. In this way, an application representation 315 includes attributes 334 of the canonical representation and the respective attributes 334 of each of the one or more edition applications 332. When generating a new application representation 315, the extraction module 314 can hierarchically arrange the canonical application 330 with respect to its corresponding edition applications 332. Furthermore, the extraction module 314 can assign the extracted attributes to the proper edition application 332. In some implementations, the canonical application 330 may inherit one or more of the edition attributes 334b of its corresponding edition applications 332. For example, core attributes such as application publisher and application developer can be inherited from an edition application 332. In some implementations, of the general attributes 334a may be propagated from the canonical application 330 to the edition applications 332. For instance, the overall downloads attribute 414c may be propagated from the canonical application 330 to a newly identified edition application 332.

In some implementations, the extraction module 314 also updates pre-existing application representations 315 already in the search index 400. For instance, if the extraction module 314 identifies application data 322 corresponding to a previously identified edition application 332, e.g., a new review of the edition application 332, the extraction module 314 may extract the attribute from the application data 322 and then insert the attribute in the application representation 315. Furthermore, in some implementations the extraction module 314 associates a timestamp with some types of attributes, as more recent attributes may be more pertinent than older attributes. For example, any attributes directed to reviews or ratings may have timestamps associated therewith so as to ensure more recent reviews or ratings are given more relevance than older reviews or ratings.

The indexing module 316 updates the search index 400. The indexing module 316 can add newly generated application representations 315 to the search index 400. If the indexing module 316 is updating the search index 400, the indexing module 316 can overwrite a previous application representation 315 with its corresponding updated application representation 315.

After generating the schema representations, the indexing module 316 generates or updates the search index 400 or search indexes with the application representations 315. In some implementations, the search index 400 may be organized, structured, and otherwise configured based, in part, on weightings of the attributes of the application representations 415. In one implementation, the weightings for an attribute may be based on the specific category of the attribute. Illustratively, core or hard metadata attributes may be weighted more heavily than soft metadata attributes. The weightings may also be based on the specific contexts and/or audiences for the search index 400.

In some implementations, the indexing module 316 generates a single search index 400 for facilitating function-based application searches. In some implementations, the indexing module 316 generates multiple search indexes 400, where each index stores and organizes applications for a different set or partition of data. The indexing module 316 can generate multiple search indexes 400 based on one or more application filters and/or attribute filters. In particular, the indexing module 316 may apply an application filter to the application representations in order to select a subset of the total number of application representations previously generated by the extraction module 314. Illustratively, the indexing module 316 may generate a specific index for APPLE'S iOS platform. As such, the indexing module 316 may apply a filter to the set of applications filtering for applications specifically developed for the iOS platform. As a result, a subset of the application representation can be identified, where each application is developed for the iOS platform.

After selecting the subset of applications for a search index, the indexing module 316 can generate a search index for the particular subset based on various attribute filters. More specifically, the attribute filters may provide different weightings for the various attributes of the subset of applications based at least in part on the context and/or audience for which the search index 400 is to be used. For example, a particular index may be directed to an enterprise application store context. As such, a filter may weight a particular attribute relating to application price relatively low because price is less of a concern in the context of business purchases. In one embodiment, the weightings can be used by the indexing module 316 to uniquely and optimally configure the search index for the particular subset of applications. In other words, the attribute filters may cause an index to be organized differently from other search indexes for different contexts and/or audiences.

In some implementations, the indexing module 316 may generate multiple indexes that include partially redundant information in order to improve performance and/or reliability. For example, the indexing module 316 may generate three redundant search indexes 400 storing data for applications determined to be popular. The indexing module 316 may additionally generate two search indexes 400 storing data for applications that are determined to be less popular. Alternatively, the indexing module 316 may distribute data across multiple indexes in a fashion similar to the RAID-5 disk scheme to improve read redundancy.

In some implementations, the search indexes 400 may be generated offline and used in a 'read-only' manner to improve caching and search performance.

In some implementations, the indexing module 316 may automatically generate new search indexes 400 by analyzing the search queries received from partners. For example, the indexing module 316 may determine that several partners have routinely searched for applications referencing a new platform over the last month. As a result, the indexing module 316 may automatically generate a new search index 400 including only applications developed for the new platform. In some implementations, the indexing module 316 may dynamically update a search index. In particular, as new data is identified the indexing module 316 may automatically update a search index 400 rather than regenerate the search index 400.

The data flow of the data processing server 300 described in FIG. 6 is provided for example only and not intended to be limiting. Furthermore, the data processing server 300 can analyze application data 322 from many different sources 110 and can generate/update application representations 315 corresponding to many different applications. Variations of the data processing server 300 are contemplated and are within the scope of the disclosure. Furthermore, the modules disclosed, e.g., the extraction module 314, may be divided into sub-modules.

Figure 8:
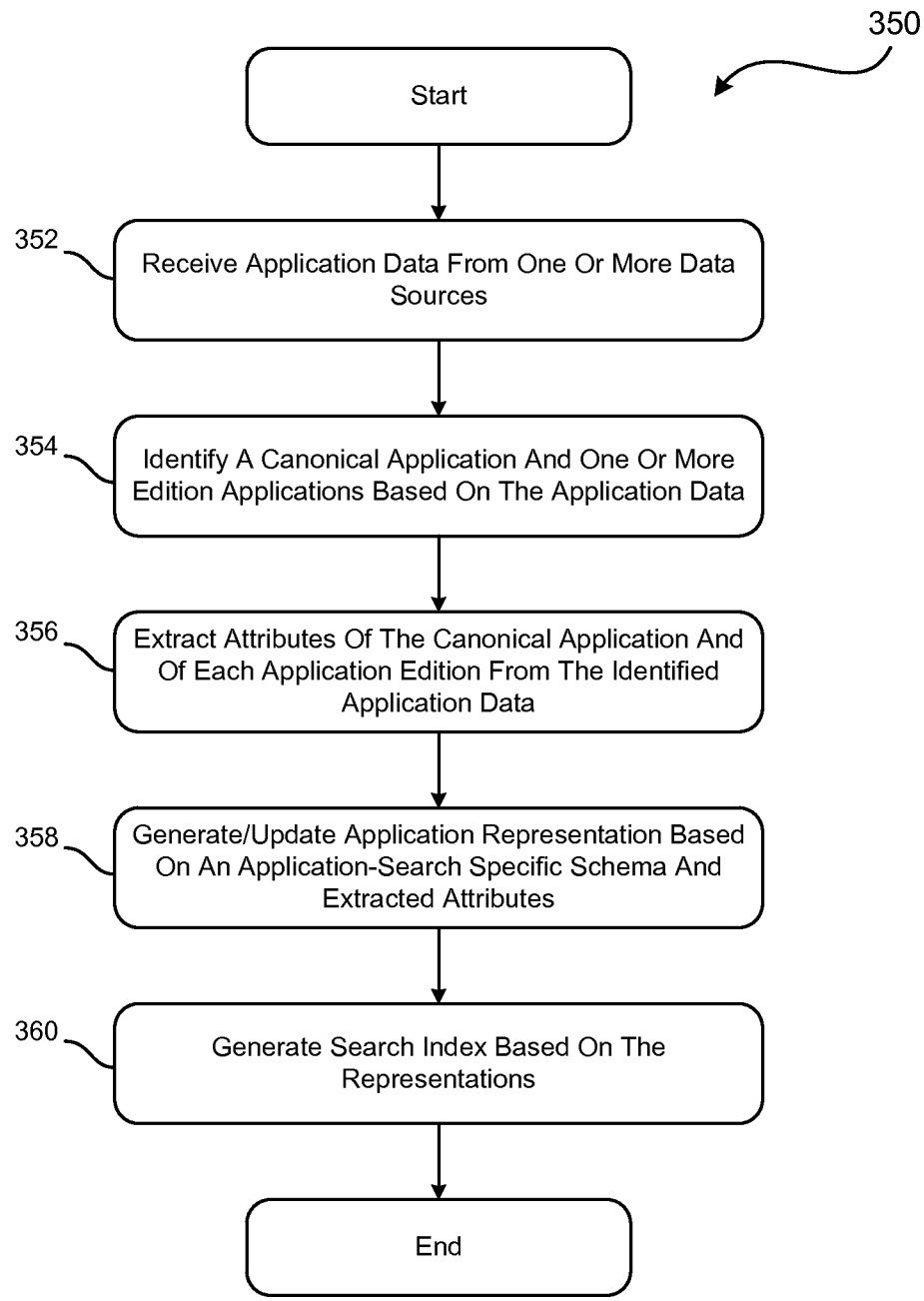
FIG. 8 is a flow chart illustrating an example arrangement of operations of a method for generating and/or updating the search index.

FIG. 8 illustrates an example arrangement of operations of a method 350 for generating and/or updating the search index 400. For purposes of explanation, the method 350 is explained with reference to the data processing server 300 of FIGS. 5 and 6. The techniques disclosed are not intended to be limited, however, to the data processing server 300 of FIGS. 5 and 6. Furthermore, the method 350 is explained with respect to a single application representation 315. The method 350 may be performed to generate/update multiple application representations without departing from the scope of the disclosure.

At operation 352, the intake module 312 obtains application data 322 from the data sources 110. As previously discussed, the intake module 312 may passively and/or actively collect the application data 322. When passively obtaining the application data 322, the intake module 312 may receive the application data directly from the data source 110. For example, an application developer 110a, an application reviewer 110d, or a blogger 110e, may transmit the application data 322 to the data processing server 300, such that the application data 322 can be included in the application representation. When actively collecting application data 322, the intake module 312 can be configured to implement one or more web crawlers or to otherwise monitor known data sources 110 to collect application data 322. In these implementations, the intake module 312 can locate relevant application data by searching for specific words or combinations of words.

At operation 354, the extraction module 314 identifies one or more edition applications 322 and a canonical application 330 corresponding to the one or more edition applications 322 based on the application data 322. The extraction module 314 can implement heuristic techniques to identify edition applications 322 to a corresponding canonical application 330 by comparing title name, developer name, and app URL of the edition application 322 to each of the canonical applications 330. For example, the extraction module 314 can remove any common words e.g., "free," "pay," "lite," "beta," "HD," "Android," "iOS," "Microsoft," from the names of the identified edition applications 332. The extraction module 314 compares the names of the identified edition applications 332 and determines a common title or dominant title of the identified edition applications 332. The extraction module 314 can then compare the common or dominant title to a list of known canonical applications 330. If a corresponding canonical application 330 is identified, the identified edition applications 332 are merged with the corresponding canonical application. The extract model 314 may also apply other heuristics to determine if one or more application editions 332 may fit under a known canonical application 330. Otherwise, the extraction module 332 creates a new canonical application 330, and may use the dominant or common name as the name of the new canonical application 330. The extraction module 314 can tag any instance of application data 322 used to identify an edition application to indicate that the instance relates to the edition application 332. In some implementations, the extraction module 314 merges the application data 322 relevant to the associated canonical application 330 or edition applications 332 such that the attributes of the application can be extracted therefrom.

At operation 356, the extraction module 314 extracts the attributes 334 of the canonical application 330 and the edition applications 332 from the application data 322. As discussed above, the extraction module 314 can implement data mining, natural language processing, heuristics, and/or rules-based inferences to extract one or more attributes 334 from the application data 322. If an instance of application data 322 is specific to a particular edition application, the attributes extracted therefrom are attributed to the particular edition application. If the instance of application data 322 generally references the canonical application 330, the attributes extracted therefrom are attributed to the canonical application 330.

At operation 358, the extraction module 314 generates or updates an application representation 315 based on the extracted attributes 334. To the extent the canonical application and the one or more edition applications are newly discovered, the extraction module 314 generate a new application representation 315 based on the canonical application 330, the one or more edition applications 332, and the extracted attributes 334. To the extent that an application representation 315 corresponding to the canonical application already exists in the search index 400, the extraction module 314 can update the application representation 315 by adding any newly extracted attributes 334 to the application representation 315. At operation 360, the indexing module 316 updates the search index 400 with the new or updated application representation 315. In the case of a new application representation 315, the indexing module 316 can add the new application representation 315 to the search index 400. In the case of an updated application representation 315, the indexing module 316 can overwrite the older version of the application representation 315 with the updated version of the application representation 315. In implementations where the data processing server 300 implements multiple search indexes 400, the indexing module 316 may determine the appropriate search indexes 400 to update based on the attributes of the new or updated application representation 315.

The method 350 described with respect to FIG. 8 is provided for example only and not intended to be limiting. Variations of the method 350 are contemplated and are within the scope of the disclosure.

Application Search Module

Figure 9:
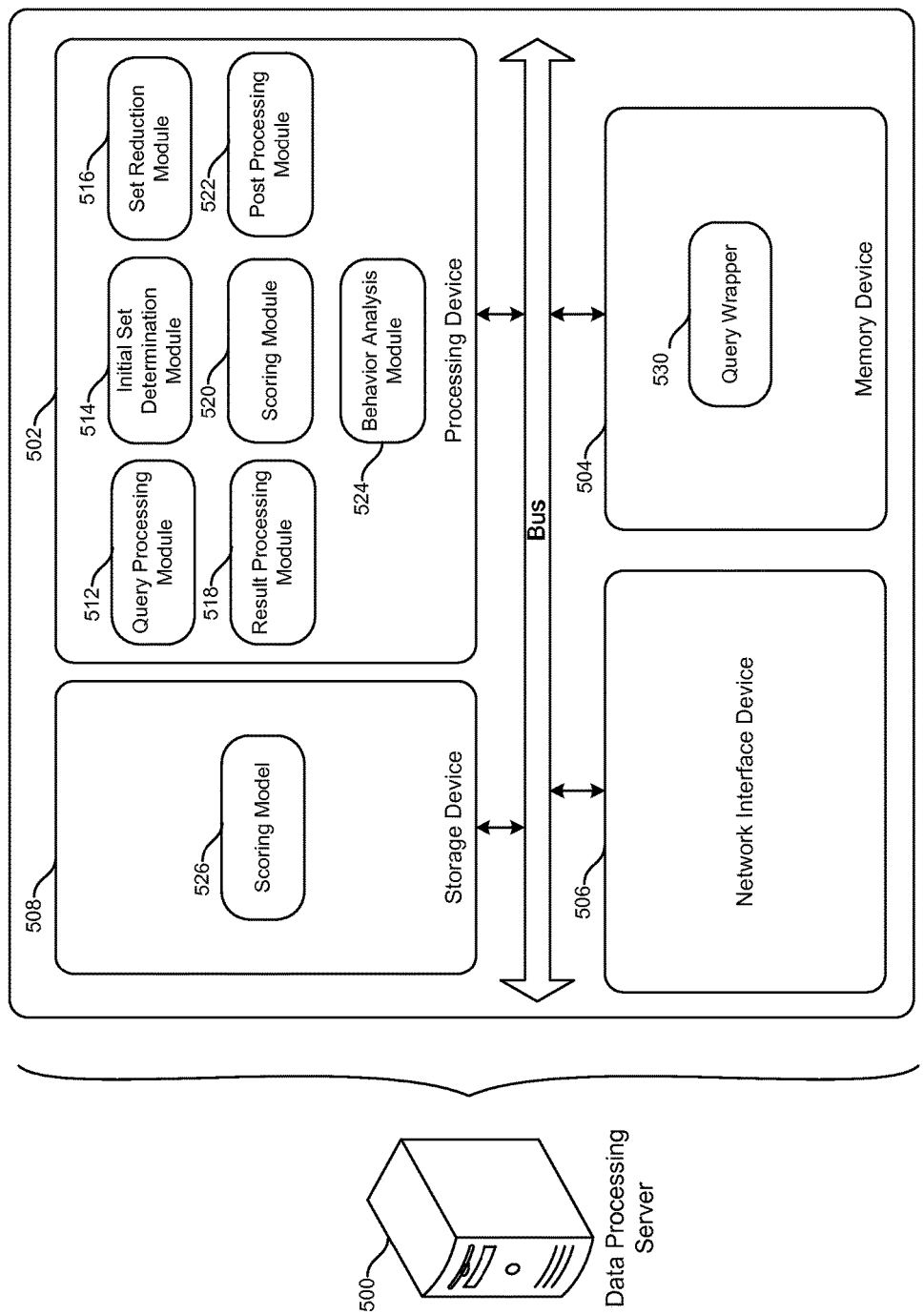
FIG. 9 is a schematic illustrating an example set of components of an application search server.

FIG. 9 is a schematic illustrating example components of an application search server 500. The application search server 500 can include a processing device 502, a memory device 504, a network interface device 506, and a storage device 508. The application search server 500 can include additional components not shown in FIG. 8. It is noted that in some implementations, the processing device 502, the memory device 504, and the network interface device 506 are similar to the components discussed with respect to the data processing server 300 (FIG. 5). Furthermore, in some implementations, the data processing server 300 and the application search server 500 can be implemented on the same physical computing device or devices.

In the illustrated example, the processing device 502 executes a query processing module 512, an initial set determination module 514, a set reduction module 516, a result set processing module 518, a scoring module 520, a post-processing module 522, and a behavior analysis module 524. The memory device 504 can store query wrappers 530 containing search queries received from partner devices 120. The storage device 508 can store one or more learned scoring models 526 that are used to score results based on the search query.

Figure 10:
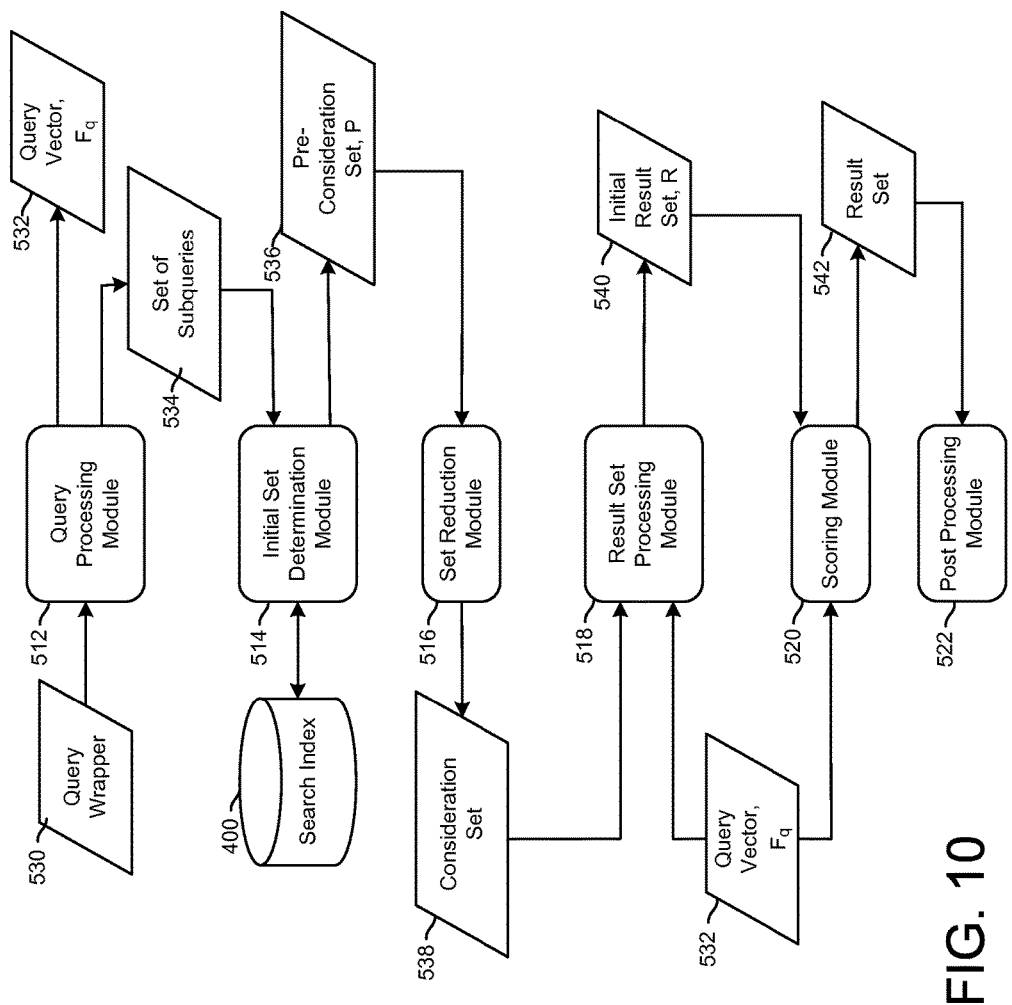
FIG. 10 is a data flow diagram illustrating an example data flow of the application search server.

FIG. 10 is a data flow diagram illustrating an example data flow of the application search server 500 of FIG. 9.

In operation, the query processing module 512 receives a search query from a partner device 120 (FIG. 1) via the network interface device 506. The search query can be a string of text, e.g., a combination of one or more words and/or numbers. In some implementations, the search query is transmitted to the application search server 500 in a query wrapper 530. As used herein, the term "query wrapper" can include any suitable data structure that includes the search query and additional contextual data. The additional contextual data can include, for example, information regarding the partner device 120 (e.g., device type and/or device operation system), the user of the partner device 120 (e.g., profile information), and/or the location of the partner device 120. The query processing module 512 can extract query features of the search query based on the contents of the search query and, possibly, the additional contextual data. The query processing module 512 can extract the query features using data mining, natural language processing, and rules-based inference techniques.

Examples of query features include a number of words in the search query, a language of the search query, application referenced in the query, predicted concepts of the search query, desired categories of the search query (e.g., "travel"), a "gaminess" feature (a likelihood that the search query is requesting games), a requested popularity (e.g., "more than 500 k downloads") and/or a frequency of the received search query. For example, a query wrapper, Q, may include the search query "educational games for teaching my three-year-old to spell" and contextual information indicating that the request was from an IPHONE®. The query processing module 512 can extract the following query features from the query wrapper: <Language="English"; Number of Words=10; Query Category="Games"; Query Age Range=2-4; . . . Device OS=iOS>. In some implementations, the query processing module 512 generates a feature vector that contains one or more query features.

The query processing module 512 can further generate a set of subqueries 534 based on the query wrapper. As used herein, the term "subquery" can refer to any query that can be derived from the query wrapper. Referring to the example query wrapper, Q, provided above, the following non-exhaustive set of subqueries may be generated from Q: "Applications for iOS;" "Applications Children;" "Game Applications;" "Educational Applications;" "Educational Games;" "Games;" "Educational;" "English Applications;" and "Applications Ages 2-4." In some implementations the query processing module 512 removes all stop words, e.g., "a," "an," "for," and "the." from the search query and/or stems the words in the search query, i.e., reducing an inflected word to its stem. Further, the query processing module 512 can determine all possible combinations of the remaining words or numbers in the search query. In some implementations, the query processing module 512 tokenizes each word in the query or in each subquery.

The initial set determination module 514 can determine a pre-consideration set 536 of applications from the search index 400 based on the set of subqueries 534. The pre-consideration set 536 is a broad set of application representations 315, such that the members in the pre-consideration set 536 are application representations that have some relevance to at least one of the sub queries 534. For example, in response to the example set of queries identified above, the search index 400 can return every application representation for every application for children, every game application, every application that relates to spelling, etc., in response to the set of subqueries identified above. In some implementations, the initial set determination module 514 identifies any application representation 315 that has one or more words or tokens in at least one of its features in common with one or more words or tokens in the subqueries. The initial set determination module 514 includes any such application representations 315 in the pre-consideration set 536. Additionally or alternatively, the initial set determination module 514 can implement other suitable techniques for identifying the pre-consideration set 536.

In some implementations, the pre-consideration set 536 includes an identifier of each application representation 315 and the application representation of the application, e.g., the features of the canonical application 330 and/or one or more edition applications 332. Thus, a pre-consideration set, P, can be represented by the following matrix:

$$P=[<ID, F_R>]$$

where ID is an identifier of a particular application representation, and $F_R$ is a result feature vector defining the features of the particular application representation. It is noted that the features of an application representation 315 can be derived from the attributes of the application representation 315. The result feature vector of each application representation 315 may include the features from any of the edition applications 332 or the canonical application 330 of the application representation. For example, the feature vector may include textual features that are extracted from the application representation, e.g., the application's name, the application's developer, and the application's platform information. In another example, the feature vector includes non-textual features that are calculated or determined by the initial set determination module 514 (or another module), such as numbers of words in its title, a star-ratings, authority scores, a "gaminess" score, and machine-learned quality scores. The feature vector may further include features related to the application's various functionalities. The feature vector may also include other data, such as the number of times the applications were clicked or downloaded for the provided input Q, the current overall popularity of the application, popularity of the application with respect to a given platform, etc. The foregoing examples of features are non-exhaustive and not intended to be limiting.

The set reduction module 516 receives the pre-consideration set 536 and reduces it to a consideration set 538. The consideration set 538 is comprised of the most relevant application representations 315. As the pre-consideration set 536 includes any potentially relevant application representation, the pre-consideration set 536 may be of a size that requires a large amount of computational resources. As such, the set reduction module 516 reduces the size of the pre-consideration set 536 into a smaller consideration set 538 that may be faster and cheaper (from a computational standpoint) to process. In some implementations, the set reduction module 516 pares down the pre-consideration set 536 by considering a specific reduced set of features of the application representations. For example, each application representation may include fifty or more different features. The set reduction module 516 may consider a reduced set of features, e.g., four or five specific features, to pare down the pre-consideration set 536. By considering fewer features, the set reduction module 516 can reduce the initial set of identified applications relatively quickly. The set reduction module 516 can consider any suitable feature to pare down the pre-consideration set 536.

In some implementations, the set reduction module 516 pares down the pre-consideration set 536 by assigning quality scores to each of the application representations 315 in the pre-consideration set 536 based on the reduced set of features. The quality scores may be generated based on how closely the reduced set of features maps to the search query and the query features thereof. For example, a quality score for an application representation may be relatively high if the application has a popularity feature that is relatively high. As another example, the set reduction module 516 may weight one or more terms or concepts identified in the search query. Thereafter, the set reduction module 516 may generate scores for the applications based on the application's association with the weighted terms or concepts of the query. Specifically, those applications associated with terms or concepts having greater weight in the search query may have higher quality scores. In some implementations, the set reduction module 516 implements Lucene to determine the quality scores of the application representations 315 in the consideration set.

In some implementations, the set reduction module 516 pares down the pre-consideration set 536 by discarding or removing application representations having quality scores that are less than or equal to a quality score threshold. For example, a quality score may range from 0 to 1. In paring down the pre-consideration set 536, the set reduction module 516 may remove any application representations 315 that do not have a quality score above a threshold of, for example, 0.7. Alternatively or additionally, the set reduction module 516 may pare down the pre-consideration set 536 by selecting the N application representations with the highest quality scores, where N is an integer greater than one and likely greater than one hundred, e.g., N=250.

The consideration set 538, C, can be represented by the following matrix:

$$C=[<ID, F_R>].$$

Much like the pre-consideration set 536, P, the consideration set 538, C, includes the identifier of each application representation 315 and the features thereof. The consideration set 538 is a subset of the pre-consideration set 536.

The result set processing module 518 determines one or more additional features (referred to as "query/result features") for each application representation 315 based on the features of the application and the query features 532. A query/result feature of an application representation 315 is a feature of the application in view of the search query. A non-limiting, non-exhaustive list of query/result features includes: a distance between query terms in an application's titles, how often the application has been selected in response to one or more of the query terms. The query/result features of each application representation 315 may be represented in a query/result feature vector. The result set processing module 518 can augment the consideration set 538 with the query/result feature vector to obtain an initial result set 540. For each application representation in the consideration set 538, the result set processing module 518 adds the query/result feature vector to the feature vector describing the features of the application. Thus, the initial result set 540, R, can be represented by the following matrix:

$$R=[<ID, F_R, F_{Q/R}>],$$

where ID is an identifier of a particular application representation, $F_R$ is the feature vector defining the features of the particular application representation, and $F_{Q/R}$ is the query/result feature vector corresponding to calculations on the particular application representation and the search query.

The scoring module 520 receives the initial result set 540 and the query feature vector and determines a score for each application representation in the initial result set 540. The overall score for an application may indicate how closely the application matches the received query and/or context of the query. In some implementations, scoring module 520 calculates the overall score for each application representation 315 based on the feature vector defining the features of the application representation 315, $F_R$, the query/result feature vector, $F_{Q/R}$, and/or the query specific features $F_q$. In some implementations, the scoring module 520 scores each application representation 315 using one or more scoring models 526. A scoring model is a learned mathematical model or formula that predicts/determines a score based a set of input parameters. The scoring models 526 can be linear or non-linear models that can capture implementations. A scoring model 526 receives the features of application representation 315, the query/results features corresponding to the application representation 315, and the query features and outputs a score indicating a degree of relevance of the application representation 315 with respect to the search query. In some implementations, the scoring module 520 can rank each application representation 315 in the initial results set 540 based on their respective scores. For example, the scoring module 520 can rank the application representations 315 from highest score to lowest score.

A scoring model 526 can be generated by way of supervised and/or unsupervised machine learning techniques. For example, a human subject can view a search query and an application provided in response to the search query and can provide a score of the application in view of the search query. The human subject can perform this task for a large amount of search query and application combinations, thereby providing a learner with a large amount of data points. Using known machine learning techniques, e.g., Gradient Boosted Decision Trees, a learner generates a scoring model based on the features of the applications, the query/result features corresponding to the applications, and the query features of the various search queries. The scoring model 526 can be generated in any other suitable manner.

The post-processing module 522 can remove application representations 315 from the initial result set 540 having scores below a threshold, or can remove the application representations 315 from the initial result set 540 having scores that are less than the M highest scored application representations 315. For example, the post-processing module 522 can remove any application representation 315 from the initial result set 540 that are not in the forty highest scored application representations 315. The remaining application representations 315 make up a result set 542. The post-processing module 522 can also obtain data that can be displayed with each application representation 315 in the result set 542, including but not limited to an icon corresponding to the application representation 315 and/or one or more screenshots corresponding to the application representation 315. In some implementations, the post-processing module 522 may format the results such that specific edition applications of an application representation that are most relevant to the query are emphasized. The post-processing module 522 can communicate the contents of the result set 542 and the additional data to the partner device 120, such that the contents may be displayed to a user.

Although not shown is FIG. 10, the behavior analysis module 524 monitors the actions of the partner device 120 that provided the query. For example, the system can determine when an application representation was eventually viewed or a corresponding edition application was downloaded by the partner device 120. Such information can be analyzed to further extract features for the application. The extracted features may be classified as behavior features, and be stored as part of the application representation. The extracted features may be used to later influence the performance of subsequent searches performed by the application search server 500.

The data flow of the application search server 500 described in FIG. 10 is provided for example only and not intended to be limiting. Variations of the application search server 500 are contemplated and are within the scope of the disclosure.

Figure 11:
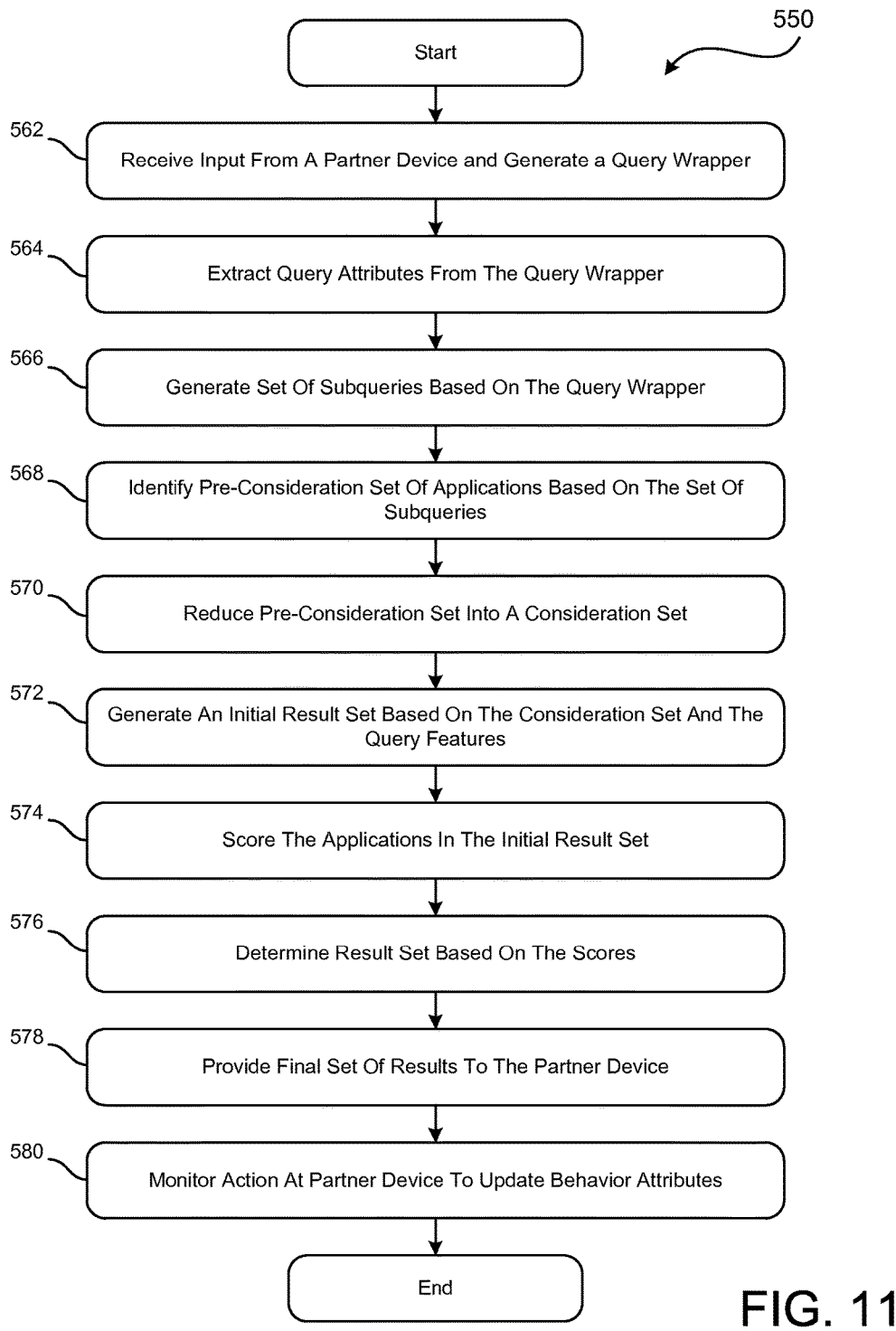
FIG. 11 is a flow chart illustrating an example arrangement of operations of a method for processing a search query.

FIG. 11 illustrates an example arrangement of operations of a method 550 for processing a search query. For purposes of explanation, the method 550 is explained with reference to the application search server 500 of FIGS. 9 and 10.

At operation 560, the query processing module 512 receives a search query from a partner device 120. As previously discussed the search query may be a string of words and/or numbers and may be communicated in a query wrapper 530. The query wrapper 530 may include additional contextual information such as a platform of the partner device 120 (or another device that provided the search query to the partner device 120), a location of the partner device 120, a user of the partner device 120, and/or one or more filters selected by the user.

At operation 562, the query processing module 512 extracts query features 532 of the search query from the text of the search query, and if applicable, the additional contextual information. The query processing module 512 can extract features such as the amount of words/numbers in the search query a number of words in the search query, a language of the search query, application referenced in the query, predicted concepts of the search query, desired categories of the search query, a "gaminess" feature, a requested popularity feature and/or a frequency of the received search query. The query processing module 512 can extract the query features 532 in any suitable manner, and the manner by which the query features 532 are extracted depends on the type of feature.

At operation 566, the query processing module 512 generates a set of subqueries 534 based on the received query and, if applicable, the additional contextual information. The query processing module 512 can remove any stop words from the search query. The query processing module 512 may also stem the remaining words in the search query. The query processing module 512 can then determine various combinations, up to all possible combinations, of the words and/or numbers in the search query and the contextual information, thereby generating the set of subqueries 534.

At operation 568, the initial set determination module 514 identifies a pre-consideration set 536 of applications based on the set of subqueries. The pre-consideration set 536 of applications can include one or more application representations 315. The query processing module 512 identifies the pre-consideration set 536 by querying the search index 400 with the subqueries 534. The search index 400 returns any application representation 315 which is implicated by at least one of the search queries. Furthermore, if the query wrapper 530 included one or more filter selections, the search index 400 only returns application representations which have the criteria indicated in the filter. For example, if the query wrapper 530 included an "iOS" filter selection, the query wrapper 530 would only include application representations 315 having an edition application 332 that is configured for the iOS platform.

At operation 570, the set reduction module 516 reduces the pre-consideration set 536 to a consideration set 538. The consideration set 538 contains the most relevant applications in the consideration set 536. The query processing module 512 analyzes a predetermined subset of features defined in the application representations 315 indicated in the pre-consideration set 536 to identify the most relevant applications. In some implementations, implements Lucene to determine quality scores for each of the application representations 315 in the pre-consideration set 536 and selects the consideration set 528 from the pre-consideration set 536 based on the scores.

At operation 572, the result set processing module 522 generates an initial result set 540 based on the consideration set 538 and the query features. In some implementations, the query processing module 512 determines a set of query/result features for each application representation 315 in the consideration set 538. The query/result features can include, but are not limited to, a distance between query terms in an application's titles, how often the application has been selected in response to one or more of the query terms, . . . . The result set processing module 518 determines the query/result features of an application representation 315 in any suitable manner. In some implementations, the result set processing module 518 generates the initial result set 540 by augmenting the consideration set 538 with the query/result features of each application representation 315.

At operation 574, the scoring module 520 scores each application representation 315 contained in the initial result set 540 based on the initial result set 540 and the query features 532. For each application representation 315, the scoring module 520 can input the features of the application representation 315, the query/result features corresponding to the application representation, and the query features 532 into a scoring model 526. The scoring model 526 outputs a score for each of the application representations 315. At operation 576, the post-processing module 522 can determine a result set 542 based on the scored application representations 315. For instance, the scoring module 520 can select the M highest scored application representations 315 or can include any application representation 315 having a score above a threshold in the result set 542. The post-processing module 522 may also obtain any data that is used to display the results at the partner device 120, e.g., screen shots of an application or an icon associated with the application. At operation 578, the result set 542 is transmitted to the partner device 120 for display.

At operation 580, the behavior analysis module 524 can monitor the behavior of the partner device 120 to determine if the user selected any of the listed applications. For example, if the user selected one of the applications listed in the result set 542 for download, the behavior analysis module 524 can update the application representation 315 of the selected application in the search index 400. In this way, the application search server 500 can receive feedback that aids the application search server 500 and the data processing server 300 better understand the meanings of the application data 322 and/or the search queries.

The method 550 described with respect to FIG. 11 is provided for example only and not intended to be limiting. Variations of the method 550 are contemplated and are within the scope of the disclosure.

In some implementations, the application search server 500 additionally provides targeted advertisements with the final results list. Identification of the advertisements can be similar to the identification of search results. For example, each of advertisements may be associated with certain functional and other features for an application for which the advertisement is promoting. Advertisements can be identified for presentation to a partner based at least in part on how closely the functional and other features of the advertisement match a search query provided by the partner.

Machine Learning Process for Function-Based Application Search

As discussed, the application search system 100 uses machine learned models to facilitate a number of different tasks. In one aspect, machine learned models are used to facilitate the generation of meta-attributes, such as text-relevance and quality. Machine learned models are additionally used to facilitate the overall scoring of identified results.

In order to generate the machine learned models, one or more machine learners are first trained. The training process begins by receiving a set of "training data." The training data can consist of a matrix of identifiers, attributes, and target scores. For example, when training for the identification of text-relevance meta-attributes, a set of target scores might be used ranging from 1 to 5. The attributes used in the training might include the number of query terms in a title, the number of important query terms, the average query term frequency, the number of reviews containing all query terms, BM-25 for reviews, BM-25 for descriptions, the first position of a match, title coverage, frequency information about query terms, etc.

Once an input vector of attributes or features with target scores is received, the process produces a model. In some implementations, the process may minimize some error function of the training set and candidate model (e.g., mean squared error). Cross-validation may also be performed to estimate accuracy of any given model, and compare different models to help choose the best one.

The generated model can then be applied to an input consisting of the same class of attributes. Responsive to the application of the model, the process outputs a predicted score—in this case a value predicting human judgment. Overall accuracy is a function of the size, distribution, and accuracy of the training set data, the quality (representativeness/accuracy) of the attributes, and the representative capacity of the machine learning process.

The implementations described herein beneficially permit the effective and efficient identification of applications based at least in part on functionality. More specifically, current search engines are document centric and utilize literal text matching techniques. Particularly, current search engines indirectly locate applications by identifying documents referencing the applications according to literal text-based matches. However, because many search queries for applications specify desired application functionalities, current search engines are unable to effectively and consistently identify applications of interest to users.

Implementations, in contrast, directly identify applications by performing searches based on application representations comprising of applications' functional attributes. Thus, implementations enable the identification of applications based on matches to the functional aspects of the applications. As a result, the search results generated by the implementations described herein can be of higher quality than those generated by current search engines.

Computing Architecture

Figure 12:
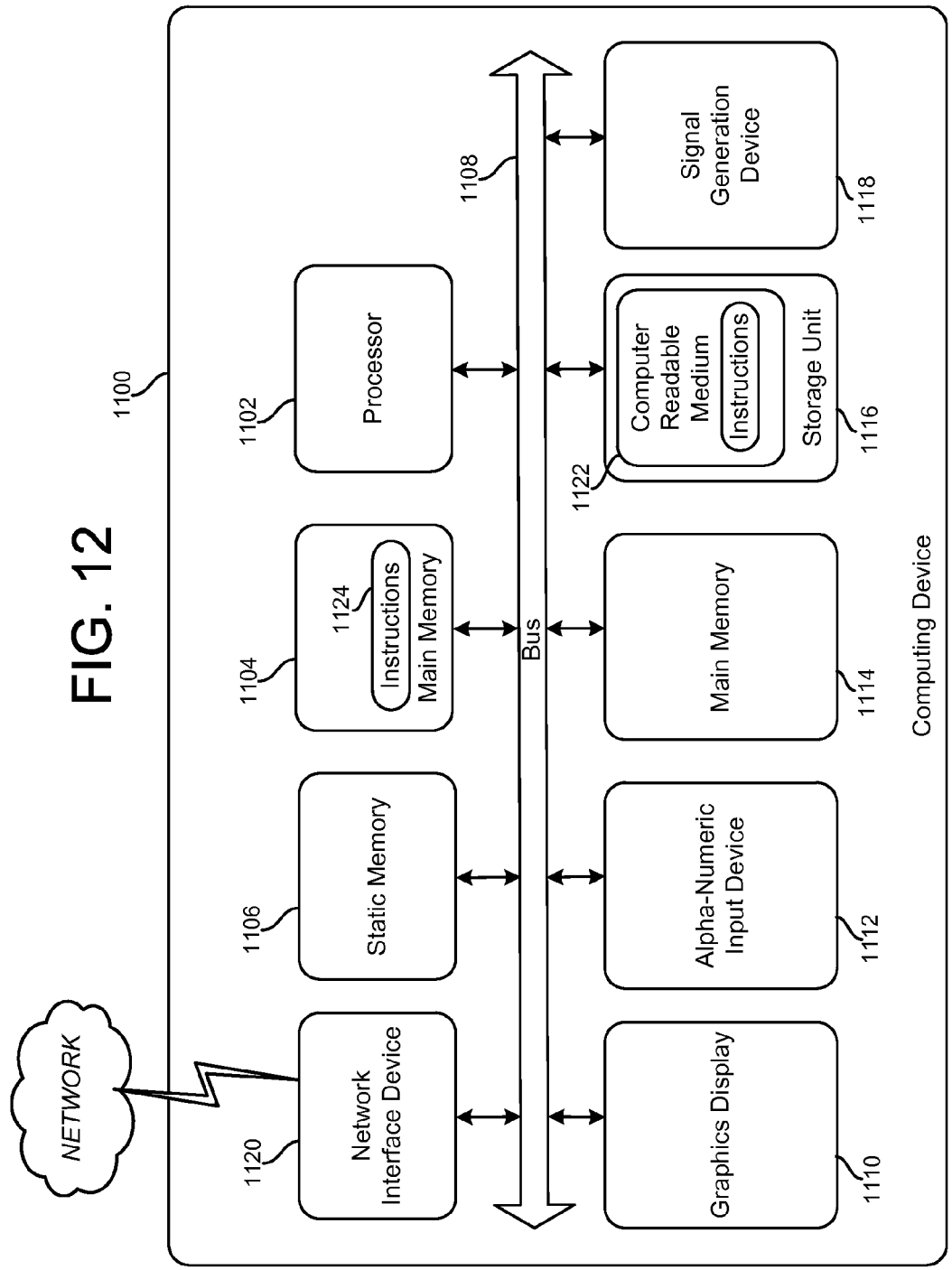
FIG. 12 is a schematic illustrating an example computing device.

FIG. 12 shows a diagrammatic representation of an example computing device 1100 within which instructions 1124 (e.g., software) for causing the computing device 1100 to perform any one or more of the methodologies discussed above may be executed. In some implementations, the computing device 1100 operates as a standalone device or may be connected (e.g., networked) to other computing devices 1100. In a networked deployment, the computing device 1100 may operate in the capacity of a server computing device or a client device in a server-client network environment, or as a peer computing device in a peer-to-peer (or distributed) network environment.

The computing device 1100 may be a server computer, a client computer, a personal computer (PC), a tablet PC, a set-top box (STB), a personal digital assistant (PDA), a cellular telephone, a smartphone, a web appliance, a network router, switch or bridge, or any computing device capable of executing instructions 1124 (sequential or otherwise) that specify actions to be taken by that computing device 1100. Further, while only a single computing device 1100 is illustrated, the term "computing device" shall also be taken to include any collection of computing device that individually or jointly execute instructions 1124 to perform any one or more of the methodologies discussed herein.

The example computing device 1100 includes one or more processors 1102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1104, and a static memory 1106, which are configured to communicate with each other via a bus 1108. The computing device 1100 may further include graphics display unit 1110 (e.g., a plasma display panel (PDP), a liquid crystal display (LCD), a projector, or a cathode ray tube (CRT)). The computing device 1100 may also include alphanumeric input device 1112 (e.g., a keyboard), a cursor control device 1114 (e.g., a mouse, a trackball, a joystick, a motion sensor, or other pointing instrument), a storage unit 1116, a signal generation device 1118 (e.g., a speaker), and a network interface device 1120, which also are configured to communicate via the bus 1108.

The storage unit 1116 includes a machine-readable medium 1122 on which is stored instructions 1124 (e.g., software) embodying any one or more of the methodologies or functions described herein. The instructions 1124 (e.g., software) may also reside, completely or at least partially, within the main memory 1104 or within the processor 1102 (e.g., within a processor's cache memory) during execution thereof by the computing device 1100, the main memory 1104 and the processor 1102 also constituting machine-readable media. The instructions 1124 (e.g., software) may be transmitted or received over a network 1126 via the network interface device 1120.

While machine-readable medium 1122 is shown in an example implementation to be a single medium, the term "machine-readable medium" should be taken to include a single medium or multiple media (e.g., a centralized or distributed database, or associated caches and servers) able to store instructions (e.g., instructions 1124). The term "machine-readable medium" shall also be taken to include any medium that is capable of storing instructions (e.g., instructions 1124) for execution by the computing device 1100 and that cause the computing device 1100 to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain implementations are described herein as including logic or a number of components, modules, or mechanisms. Modules may constitute either software modules (e.g., code embodied on a machine-readable medium) or hardware modules. A hardware module is tangible unit capable of performing certain operations and may be configured or arranged in a certain manner. In example implementations, one or more computer systems (e.g., a standalone, client or server computer system) or one or more hardware modules of a computer system (e.g., a processor or a group of processors, e.g., processor 102) may be configured by software (e.g., an application or application portion) as a hardware module that operates to perform certain operations as described herein.

In various implementations, a hardware module may be implemented mechanically or electronically. For example, a hardware module may comprise dedicated circuitry or logic that is permanently configured (e.g., as a special-purpose processor, such as a field programmable gate array (FPGA), an application-specific integrated circuit (ASIC), a system on a chip (SoC), a chipset) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 102, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example implementations, comprise processor-implemented modules.

The one or more processors may also operate to support performance of the relevant operations in a "cloud computing" environment or as a "software as a service" (SaaS). For example, at least some of the operations may be performed by a group of computers (as examples of computing devices including processors), these operations being accessible via a network (e.g., the Internet) and via one or more appropriate interfaces (e.g., application program interfaces (APIs).)

The performance of certain of the operations may be distributed among the one or more processors, not only residing within a single computing device, but deployed across a number of computing devices. In some example implementations, the one or more processors or processor-implemented modules may be located in a single geographic location (e.g., within a home environment, an office environment, or a server farm). In other example implementations, the one or more processors or processor-implemented modules may be distributed across a number of geographic locations.

Some portions of this specification presented in terms of algorithms or symbolic representations of operations on data stored as bits or binary digital signals within a machine memory (e.g., the computer memory 104). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a computing device. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a computing device that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some implementations" or "an implementation" means that a particular element, attribute, structure, or characteristic described in connection with the implementation is included in at least one implementation. The appearances of the phrase "in some implementations" in various places in the specification are not necessarily all referring to the same implementation.

Some implementations may be described using the expression "coupled" and "connected" along with their derivatives. For example, some implementations may be described using the term "coupled" to indicate that two or more elements are in direct physical or electrical contact. The term "coupled," however, may also mean that two or more elements are not in direct contact with each other, but yet still co-operate or interact with each other. The implementations are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the implementations herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for enabling function-based application search through the disclosed principles herein. Thus, while particular implementations and applications have been illustrated and described, it is to be understood that the disclosed implementations are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
receiving, by a processing device, a search query from a partner device via a network;
extracting, by the processing device, one or more query features of the search query from the search query;
identifying, by the processing device, a consideration set of application representations based on the search query and a search index that indexes a plurality of application representations, each application representation being a data structure representing a different application and defining features of the application and editions of the application, the features of the application and editions of the application being extracted from one or more documents obtained from one or more respective sources separate from the application, and each document relating to the application;
determining, by the processing device, a score for each application representation in the consideration set of application representations based on the one or more query features of the search query and one or more machine-learned scoring models;
determining, by the processing device, a ranked result set based on the scores of the application representations, the ranked result set indicating one or more applications that correspond to the search query; and
transmitting, by the processing device, the ranked result set to the partner device via the network.

2. The method of claim 1, wherein identifying the consideration set of application representations includes:
identifying a pre-consideration set of application representations from the search index by querying the search index using the search query; and
reducing the pre-consideration set of application representations into the consideration set of application representations based on a subset of features defined in the application representations of the pre-consideration set of application representations.

3. The method of claim 2, wherein identifying the pre-consideration set of application representations includes:
generating a set of sub-queries based on the search query and context data, the set of sub-queries representing different combinations of query terms in the search query and instances of information in the context data;

querying the search index with at least one of the set of sub-queries, the search index identifying any application representations that are relevant to the at least one of the set of sub-queries; and including the identified application representations in the pre-consideration set of application representations.

4. The method of claim 1, wherein receiving the search query includes receiving a query wrapper containing the search query and context data indicating information related to the partner device.

5. The method of claim 4, wherein identifying the consideration set of application representations further includes:

generating a set of sub-queries based on the search query;

querying the search index with at least one of the set of sub-queries, the search index identifying any application representations that are relevant to the at least one of the set of sub-queries;

including the identified application representations in a pre-consideration set of application representations; and reducing the pre-consideration set of application representations into the consideration set of application representations based on a subset of features defined in the application representations included in the pre-consideration set of application representations.

6. The method of claim 1, wherein determining the score for each application representation in the consideration set of application representations includes:

determining one or more query/result features of the application representation, each query/result feature defining a feature of the application representation with respect to the search query; and feeding at least a subset of the features of the application, the query/result features, and the query features to the one or more machine-learned scoring models.

7. The method of claim 1, wherein determining the ranked result set includes:

ranking the scored application representations based on the respective scores thereof; and selecting one or more of the ranked scored application representations for inclusion in the ranked result set based on the respective ranking of the ranked scored application representations.

8. The method of claim 1, wherein transmitting the ranked result set includes:

for each application representation indicated in the ranked result set:

obtaining display data corresponding to the application represented by the application representation, and including the display data with the application representation.

9. The method of claim 1, wherein the partner device is a user device.

10. A search server comprising:

a storage device that stores:

a plurality of application representations, each application representation being a data structure representing a different application and including one or more features of the application and identifying one or more editions of the application, the one or more features of the application and editions of the application being extracted from one or more documents obtained from one or more respective sources separate from the application, each document relating to at least one edition of the application; and a search index that indexes the plurality of application representations, the search index being keyed by a set of attributes that correspond to at least one of the applications represented by the application representations stored in the storage device;

a processing device that executes computer-readable instructions, the computer-executable instructions causing the processing device to:

receive a search query from a partner device via a network;

extract one or more query features of the search query from the search query;

identify a consideration set of application representations based on the search query and the search index;

determine a score for each application representation in the consideration set of application representations based on the one or more query features of the search query and one or more machine-learned scoring models;

determine a ranked result set based on the scores of the application representations, the ranked result set indicating one or more applications that correspond to the search query; and transmit the ranked result set to the partner device via the network.

11. The search server of claim 10, wherein identifying the consideration set of application representations includes:

identifying a pre-consideration set of application representations from the search index by querying the search index using the search query; and reducing the pre-consideration set of application representations into the consideration set of application representations based on a subset of features defined in the application representations of the pre-consideration set of application representations.

12. The search server of claim 11, wherein identifying the consideration set of application representations includes:

generating a set of sub-queries based on the search query and context data, the set of sub-queries representing different combinations of query terms in the search query and instances of information in the context data;

querying the search index with at least one of the set of sub-queries, the search index identifying any application representations that are relevant to the at least one of the set of sub-queries; and including the identified application representations in the pre-consideration set of application representations.

13. The search server of claim 10, wherein receiving the search query includes receiving a query wrapper containing the search query and context data indicating information related to the partner device.

14. The search server of claim 13, wherein identifying the consideration set of application representations further includes:

generating a set of sub-queries based on the search query;

querying the search index with at least one of the set of sub-queries, the search index identifying any application representations that are relevant to the at least one of the set of sub-queries;

including the identified application representations in a pre-consideration set of application representations; and reducing the pre-consideration set of application representations into the consideration set of application representations based on a subset of features defined in the application representations included in the pre-consideration set of application representations.

15. The search server of claim 10, wherein determining the score for each application representation in the consideration set of application representations includes:
- determining one or more query/result features of the application representation, each query/result feature defining a feature of the application representation with respect to the search query; and
- feeding at least a subset of the features of the application, the query/result features, and the query features to the one or more machine-learned scoring models.

16. The search server of claim 10, wherein determining the ranked result set includes:
- ranking the scored application representations based on the respective scores thereof; and
- selecting one or more of the ranked scored application representations for inclusion in the ranked result set based on the respective ranking of the ranked scored application representations.

17. The search server of claim 10, wherein transmitting the ranked result set includes:
- for each application representation indicated in the ranked result set:
- obtaining display data corresponding to the application represented by the application representation; and
- including the display data with the application representation.

18. The search server of claim 10, wherein the partner device is a user device.

\* \* \* \* \*